(12) United States Patent
Inagaki et al.

(10) Patent No.: US 7,927,740 B2
(45) Date of Patent: Apr. 19, 2011

(54) BATTERY PACK AND VEHICLE

(75) Inventors: Hiroki Inagaki, Kawasaki (JP);
Yoshinao Tatebayashi, Yokohama (JP);
Hideaki Morishima, Ichikawa (JP);
Haruchika Ishii, Kawasaki (JP);
Hidesato Saruwatari, Kawasaki (JP);
Norio Takami, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1030 days.

(21) Appl. No.: 11/260,410

(22) Filed: Oct. 28, 2005

(65) Prior Publication Data
US 2006/0216600 A1     Sep. 28, 2006

(30) Foreign Application Priority Data

| Mar. 24, 2005 | (JP) | 2005-085979 |
| Aug. 25, 2005 | (JP) | 2005-244395 |
| Oct. 6, 2005 | (JP) | 2005-293906 |

(51) Int. Cl.
*H01M 4/58* (2010.01)
*H01M 4/00* (2010.01)
*H01M 4/50* (2010.01)

(52) U.S. Cl. ............ 429/231.1; 429/221; 429/223; 429/224; 429/231.2; 429/231.3

(58) Field of Classification Search ............ 429/152, 429/221, 223, 224, 231.1, 231.3, 231.5
See application file for complete search history.

(56) References Cited

U.S. PATENT DOCUMENTS

| 6,400,323 | B2 * | 6/2002 | Yasukawa et al. | 343/700 MS |
| 2002/0102204 | A1 * | 8/2002 | Kohiro et al. | 423/594 |
| 2003/0010631 | A1 * | 1/2003 | Anzai | 204/293 |
| 2004/0234864 | A1 * | 11/2004 | Kubota | 429/317 |
| 2005/0064282 | A1 * | 3/2005 | Inagaki et al. | 429/163 |
| 2005/0069777 | A1 * | 3/2005 | Takami et al. | 429/245 |
| 2005/0095499 | A1 * | 5/2005 | Kanai et al. | 429/83 |
| 2005/0221173 | A1 | 10/2005 | Tatebayashi et al. | |
| 2005/0221187 | A1 | 10/2005 | Inagaki et al. | |
| 2005/0221188 | A1 | 10/2005 | Takami et al. | |
| 2006/0062721 | A1 * | 3/2006 | Tsay et al. | 423/594.6 |
| 2006/0134520 | A1 | 6/2006 | Ishii et al. | |
| 2007/0042264 | A1 * | 2/2007 | Desilvestro et al. | 429/152 |
| 2008/0070115 | A1 | 3/2008 | Saruwatari et al. | |

FOREIGN PATENT DOCUMENTS

| CN | 1356736 A | 7/2002 |
| JP | 9-199179 | 7/1997 |
| JP | 10-69922 | 3/1998 |

(Continued)

OTHER PUBLICATIONS

U.S. Appl. No. 11/148,169, filed Jun. 9, 2005, Inagaki et al.

(Continued)

*Primary Examiner* — Patrick Ryan
*Assistant Examiner* — Muhammad Siddiquee
(74) *Attorney, Agent, or Firm* — Oblon, Spivak, McClelland, Maier & Neustadt, L.L.P.

(57) ABSTRACT

A battery pack includes nonaqueous electrolyte batteries each comprising a positive electrode and a negative electrode. The positive electrode contains a lithium-transition metal oxide having a layered crystal structure. The negative electrode contains a lithium-titanium composite oxide having a spinel structure. And the positive electrodes and the negative electrodes satisfy the formula (1) given below:

$$1.02 \leq X \leq 2 \qquad (1)$$

where X is a ratio of an available electric capacity of each of the negative electrodes at 25° C. to an available electric capacity of each of the positive electrodes at 25° C.

20 Claims, 7 Drawing Sheets

FOREIGN PATENT DOCUMENTS

| | | |
|---|---|---|
| JP | 10-208747 | 8/1998 |
| JP | 10-224998 | 8/1998 |
| JP | 2000-12090 | 1/2000 |
| JP | 200260472 * | 9/2000 |
| JP | 2001-243952 | 9/2001 |
| JP | 2003-115328 | 4/2003 |
| JP | 2004-39484 | 2/2004 |
| JP | 2004-80949 | 3/2004 |
| JP | 2004-171955 | 6/2004 |
| JP | 2004-281158 | 10/2004 |
| JP | 2004-296098 | 10/2004 |
| WO | WO 2005/018038 A2 | 2/2005 |

OTHER PUBLICATIONS

U.S. Appl. No. 11/228,430, filed Sep. 19, 2005, Inagaki et al.
U.S. Appl. No. 11/257,040, filed Oct. 25, 2005, Inagaki et al.
U.S. Appl. No. 11/260,435, filed Oct. 28, 2005, Takami et al.
U.S. Appl. No. 11/261,538, filed Oct. 31, 2005, Inagaki et al.
U.S. Appl. No. 11/244,042, filed Oct. 6, 2005, Morishima, et al.
U.S. Appl. No. 11/387,776, filed Mar. 24, 2006, Inagaki et al.
U.S. Appl. No. 11/687,844, filed Mar. 19, 2007, Fujita, et al.
U.S. Appl. No. 11/687,860, filed Mar. 19, 2007, Fujita, et al.
U.S. Appl. No. 11/694,454, filed Mar. 30, 2007, Inagaki, et al.
U.S. Appl. No. 12/047,857, filed Mar. 13, 2008, Ishii, et al.
U.S. Appl. No. 11/756,259, filed May 31, 2007, Saruwatari, et al.
U.S. Appl. No. 11/470,482, filed Sep. 6, 2006, filed Takami, et al.
U.S. Appl. No. 11/531,142, filed Sep. 12, 2006, Morishima, et al.
U.S. Appl. No. 11/940,688, filed Nov. 15, 2007, Inagaki, et al.
U.S. Appl. No. 11/230,635, filed Sep. 21, 2005, Takami, et al.
U.S. Appl. No. 11/230,482, filed Sep. 21, 2005, Takami, et al.
U.S. Appl. No. 12/366,914, filed Feb. 6, 2009, Inagaki, et al.
U.S. Appl. No. 12/512,540, filed Jul. 30, 2009, Inagaki, et al.

* cited by examiner

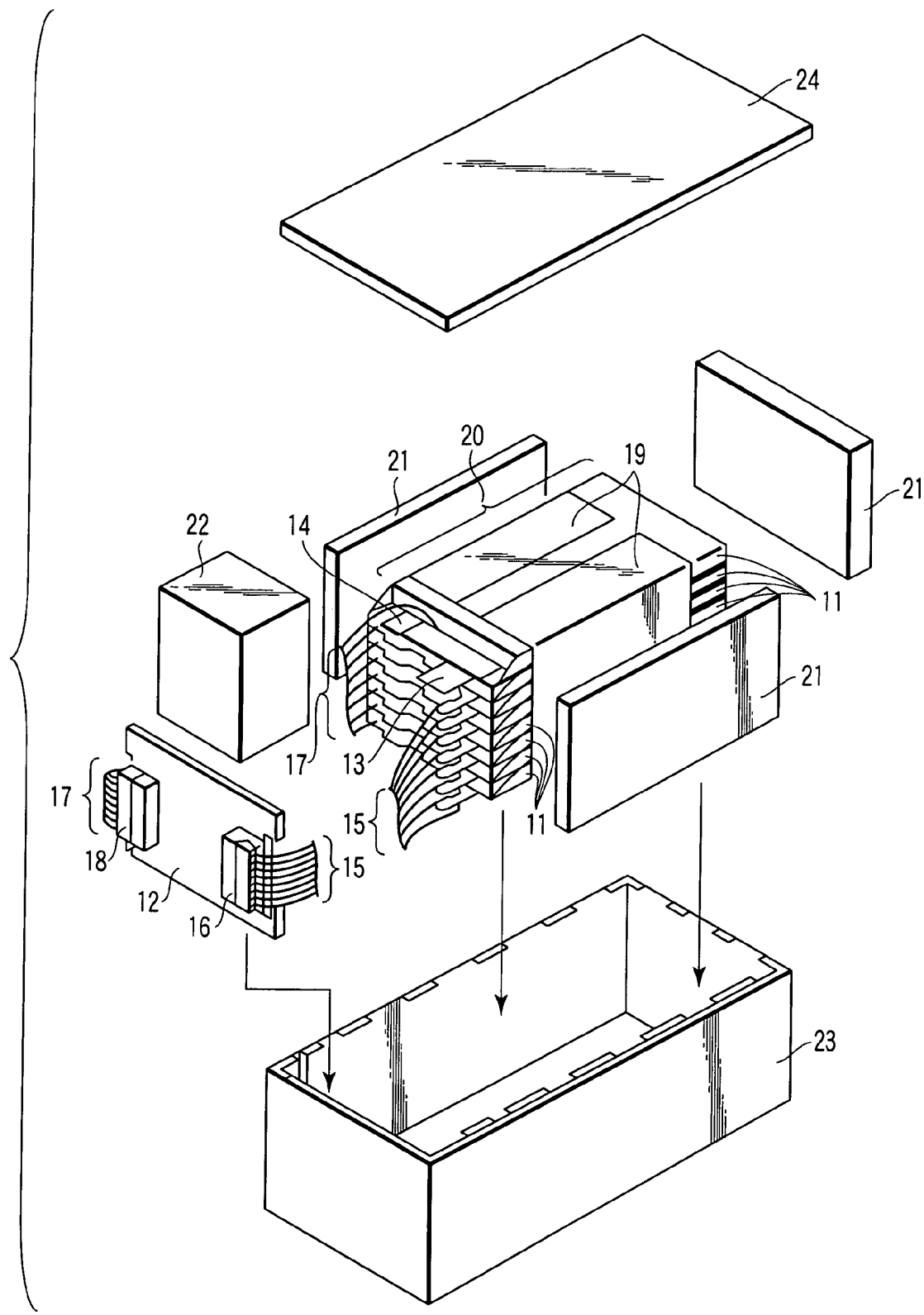
F I G. 2

BATTERY PACK AND VEHICLE

CROSS-REFERENCE TO RELATED APPLICATIONS

This application is based upon and claims the benefit of priority from prior Japanese Patent Applications No. 2005-085979, filed Mar. 24, 2005; No. 2005-244395, filed Aug. 25, 2005; and No. 2005-293906, filed Oct. 6, 2005, the entire contents of all of which are incorporated herein by reference.

BACKGROUND OF THE INVENTION

1. Field of the Invention

The present invention relates to a battery pack using nonaqueous electrolyte batteries and to a vehicle using the battery pack.

2. Description of the Related Art

A nonaqueous electrolyte battery has attracted attentions as a battery having a high energy density, and vigorous research is being conducted on a nonaqueous electrolyte battery that is charged and discharged by the migration of Li ions between the negative electrode and the positive electrode.

Various properties are required for the nonaqueous electrolyte battery depending on the use of the battery. For example, long charge-discharge cycle characteristics under a high temperature environment are required when it comes to a nonaqueous electrolyte battery mounted on a vehicle such as a hybrid electric automobile or used for the emergency power supply of an electronic apparatus.

Generally used nowadays is a nonaqueous electrolyte battery in which a lithium-transition metal composite oxide is used as a positive electrode active material and a carbonaceous material is used as a negative electrode active material.

In recent years, a nonaqueous electrolyte battery in which a lithium-titanium composite oxide having a Li absorption-release potential higher than 1.0 V is used as the negative electrode active material has been put to the practical use. Since the lithium-titanium composite oxide is small in the change of volume accompanying the charge-discharge operation of the battery, the lithium-titanium composite oxide is expected to impart excellent charge-discharge cycle characteristics to the battery.

Among the lithium-titanium composite oxides, the spinel type lithium-titanium composite oxide is particularly excellent in the charge-discharge cycle characteristics and is expected to be prominently useful. Japanese Patent Disclosure (Kokai) No. 9-199179 discloses a lithium ion battery in which lithium titanate is used as a negative electrode material. The lithium-titanium composite oxide also includes ramsdellite type lithium-titanium composite oxide having a composition formula of $Li_2Ti_3O_7$, as disclosed in Japanese Patent Disclosure No. 2000-12090.

On the other hand, Japanese Patent Disclosure No. 10-69922 discloses a nonaqueous electrolyte lithium secondary battery comprising a negative electrode formed mainly of the spinel type lithium-titanium composite oxide and a positive electrode having a potential higher than that of the spinel type lithium-titanium composite oxide. It is disclosed in this patent document that, if the ratio of the electric capacity of the negative electrode to that of the positive electrode is increased to 1.1 or 1.2, the positive electrode potential is markedly lowered to a value in the vicinity of zero in the last period of the discharge to degrade the positive electrode characteristics, leading to deterioration of the capacity.

On the other hand, Japanese Patent Disclosure No. 2004-171955 relates to a bipolar battery comprising a bipolar electrode including a current collector, a positive electrode active material layer formed on one surface of the current collector, and a negative electrode active material layer formed on the other surface of the current collector. It is disclosed that a plurality of bipolar electrodes constructed as described above are stacked one upon the other with an electrolyte layer sandwiched therebetween so as to provide the bipolar battery. In this prior art, a changeable electrode active material and an unchangeable electrode active material are used in the electrode active material layers. The changeable electrode active material exhibits the characteristics that, when the charge capacity is reached, the voltage is changed in a manner to exceed the rate of change of the voltage before the charge capacity is reached. On the other hand, unchangeable electrode active material exhibits the characteristics that, even if the charge capacity of the changeable electrode active material is reached, the rate of change of the voltage is substantially left unchanged. In this prior art, the changeable electrode active material is used in the positive electrode active material layer or the negative electrode active material layer, and the unchangeable electrode material is used in the other electrode active material layer. The particular construction permits the bipolar battery to exhibit the characteristics that the change of voltage in the end period of the charging is increased in a manner to exceed the previous rate of change of the voltage. As a result, it is possible to prevent an over charge of the battery module. In Example 1 of Japanese Patent Disclosure No. 2004-171955 referred to above, the positive electrode active material layer containing spinel type lithium manganate is used as the changeable electrode, and a negative electrode active material layer containing lithium titanate is used as the unchangeable electrode. It is taught that the charge capacity of the negative electrode active material layer (unchangeable electrode) is set at 120% of the charge capacity of the positive electrode active material layer (changeable electrode) so as to increase the change of voltage in the end period of the charging of the bipolar battery. It is also taught in Example 2 of the patent document quoted above that, if the charge capacity of the positive electrode active material layer is set at 120% of the charge capacity of the negative electrode active material layer, it is possible to change the negative electrode active material layer into the changeable electrode. Further, it is taught in this patent document that $LiFePO_4$ can be used as the positive electrode active material.

BRIEF SUMMARY OF THE INVENTION

An object of the present invention is to provide a battery pack excellent in the charge-discharge cycle characteristics and a vehicle using the battery pack.

According to a first aspect of the present invention, there is provided a battery pack comprising nonaqueous electrolyte batteries, each comprising:

a positive electrode a lithium-transition metal oxide having a layered crystal structure;

a negative electrode containing a lithium-titanium composite oxide having a spinel structure; and a nonaqueous electrolyte, wherein the positive electrodes and the negative electrodes satisfy the formula (1) given below:

$$1.02 \leq X \leq 2 \tag{1}$$

where X is a ratio of an available electric capacity of each of the negative electrodes at 25° C. to an available electric capacity of each of the positive electrodes at 25° C.

According to a second aspect of the present invention, there is provided a vehicle comprising a battery pack, the battery pack comprising nonaqueous electrolyte batteries, each comprising:

a positive electrode a lithium-transition metal oxide having a layered crystal structure;

a negative electrode containing a lithium-titanium composite oxide having a spinel structure; and a nonaqueous electrolyte, wherein the positive electrodes and the negative electrodes satisfy the formula (1) given above.

BRIEF DESCRIPTION OF THE SEVERAL VIEWS OF THE DRAWING

FIG. 2 is an oblique view showing in a dismantled fashion the construction of the battery pack according to an embodiment of the present invention;

DETAILED DESCRIPTION OF THE INVENTION

Figure 1A:
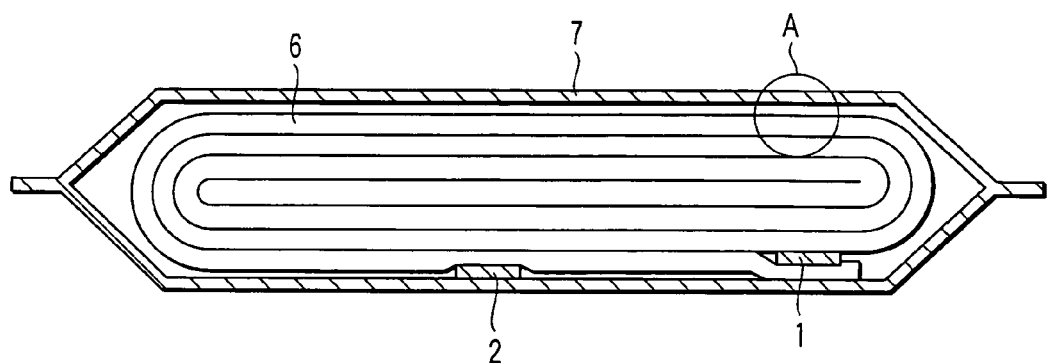
FIG. 1A is a cross-sectional view schematically showing as an example the construction of a unit cell used for forming the battery pack according to an embodiment of the present invention.

As a result of extensive research, the present inventors have found that a battery pack, which comprises a battery module comprising as unit cells a plurality of nonaqueous electrolyte batteries each comprising a lithium-titanium composite oxide used as the negative electrode active material and a lithium-transition metal composite oxide used as the positive electrode active material, is low in the charge-discharge cycle characteristics. Particularly, it has been found that the charge-discharge cycle characteristics of the battery pack are prominently impaired under an environment of a high temperature.

For example, when it comes to a battery pack comprising a lithium-titanium composite oxide having a spinel structure (hereinafter referred to a spinel type lithium-titanium composite oxide) used as the negative electrode active material and a lithium-cobalt composite oxide used as the positive electrode active material, the number of the charge-discharge cycles which reaches the discharge capacity retention ratio of 80%, was found to be smaller than 100 under a temperature environment of 45° C. in the case where the available electric capacity of the negative electrode was set equal to that of the positive electrode.

The mechanism for deterioration of the charge-discharge cycle characteristics noted above will now be described.

The deterioration of the charge-discharge cycle characteristics under an environment of a high temperature noted above is derived from the situation that the increase in the available electric capacity of the negative electrode accompanying the temperature elevation is larger than that of the positive electrode. Therefore, if the available electric capacity of the negative electrode at room temperature is smaller than that of the positive electrode, the balance in the available electric capacity between the positive electrode and the negative electrode collapses under an environment of high temperature, with the result that the positive electrode is caused to assume an over-charged state in the ordinary charge-discharge cycle and, thus, the charge-discharge cycle characteristics are markedly impaired.

The deterioration of the charge-discharge cycle characteristics will now be described in detail with reference to FIG. 8. To be more specific, FIG. 8 is a graph showing the dependence on temperature of the charge-discharge curve in respect of the positive electrode potential, the negative electrode potential and the battery voltage.

The charge-discharge curve is directed to a nonaqueous electrolyte battery using the spinel type lithium-titanium composite oxide in the negative electrode and a lithium-cobalt composite oxide in the positive electrode and designed such that the positive electrode and the negative electrode are equal to each other in the available electric capacity. For preparation of the graph shown in FIG. 8, the positive electrode potential, the negative electrode potential and the battery voltage were measured under a constant current under a temperature environment of 25° C., 45° C. and 60° C. In this case, it is appropriate to carry out the charge-discharge cycle within the battery voltage range of 1.5 V to 2.8 V. Incidentally, the range of the battery voltage in the charge-discharge cycle operation was set on the basis that the temperature of the environment was set at 25° C.

Figure 8:
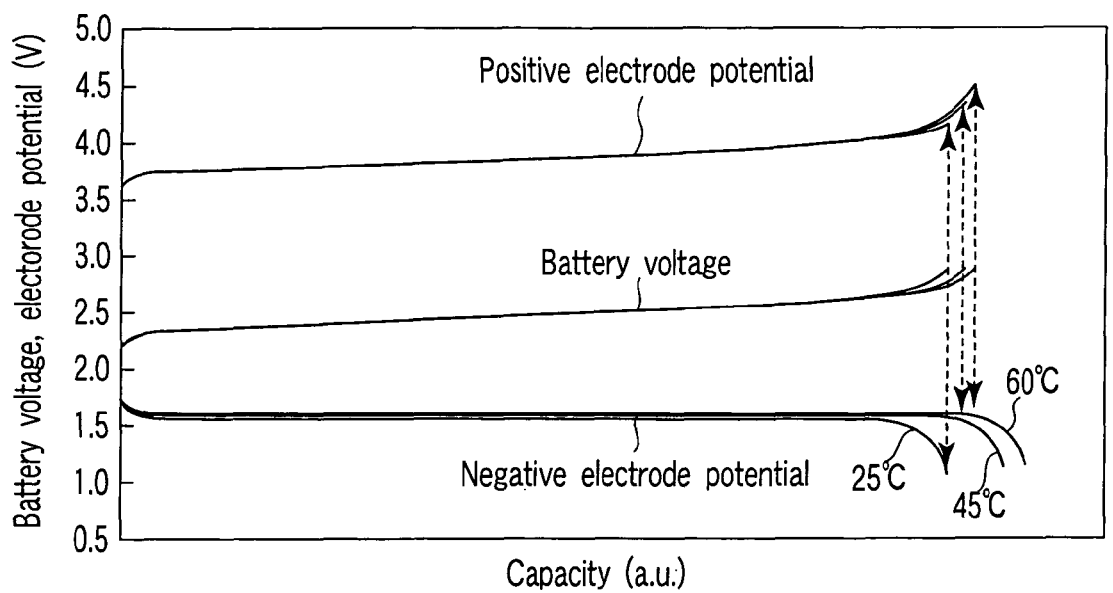
FIG. 8 is a graph showing the dependence on temperature of the charge-discharge curves of the positive electrode potential, the negative electrode potential and the battery voltage, covering the case where the ratio X of the available electric capacity of the negative electrode to the available electric capacity of the positive electrode is 1.

As shown in FIG. 8, the charge-discharge curve of the negative electrode potential is shifted in a direction in which the available electric capacity is increased in accordance with the temperature elevation in the last period of the charging. On the other hand, the dependence on temperature is scarcely recognized in the charge-discharge curve of the positive electrode potential.

As a result, the positive electrode and the negative electrode are equal to each other in the available electric capacity under a temperature environment of 25° C. On the other hand, the available electric capacity of the negative electrode is larger than that of the positive electrode under a temperature environment of 60° C. In other words, when it comes to the charge-discharge curve under a temperature environment of 25° C., the negative electrode potential is rapidly lowered before the positive electrode potential is rapidly elevated. On the other hand, when it comes to the charge-discharge curve under a temperature environment of 45° C. and 60° C., the negative electrode potential is rapidly lowered after the positive electrode potential is rapidly elevated.

Such being the situation, the battery voltage under a 100%-charged state assumes a constant voltage of 2.8 V. It follows that the change in the battery voltage in the last period of the charging under a temperature environment of 25° C. is greatly dependent on the drop of the negative electrode potential (regulation by negative electrode). On the other hand, the change in the battery voltage in the last period of the charging under a temperature environment of 45° C. and 60° C. is greatly dependent on the elevation of the positive electrode potential (regulation by positive electrode).

The regulation by the negative electrode will now be described. When it comes to the charge-discharge curve of the negative electrode containing the spinel type lithium-titanium composite oxide, the change in potential is large in the last period of the charging and in the last period of the discharging. As a result, the change in the battery voltage in the last period of the charging becomes large in the case of the regulation by the negative electrode. On the other hand, the capacities of the unit cells constituting the battery module are somewhat nonuniform, with the result that the unit cells also become nonuniform in the battery voltage. If the spinel type lithium-titanium composite oxide is used in the negative electrode of the unit cell, the difference in the battery voltage derived from the nonuniformity in the capacity of the unit cells is increased in the last period of the charging. As a result, some of the unit cells is over-charged regardless of the situation that the charging capacity is the same to impair the charge-discharge cycle life.

On the other hand, under a temperature environment of 45° C. and 60° C., the change in the battery voltage in the last period of the charging is substantially dependent on the change in the positive electrode potential. However, since the negative electrode potential is elevated in the last period of the charging, the positive electrode potential is elevated to reach an over-charged region with elevation of the negative electrode potential. It follows that the crystal structure of the positive electrode active material is changed, and the nonaqueous electrolyte is decomposed by oxidization to cause the charge-discharge cycle characteristics to deteriorate.

To be more specific, FIG. 8 shows that, under a 100%-charged state, the negative electrode potential is set at 1.30 V and the positive electrode potential is set at 4.10 V under a temperature environment of 25° C., the negative electrode potential is set at 1.50 V and the positive electrode potential is set at 4.30 V under a temperature environment of 45° C., and the negative electrode potential is set at 1.55 V and the positive electrode potential is set at 4.35 V under a temperature environment of 60° C.

As pointed out above, the positive electrode potential under a 100%-charged state is increased with elevation of the temperature to reach an over-charged state. As a result, the change in the crystal structure of the positive electrode active material and the decomposition of the nonaqueous electrolyte by oxidation are brought about to cause the charge-discharge cycle characteristics to deteriorate.

As described above, the increase in the available electric capacity of the negative electrode accompanying the temperature elevation is larger than that of the positive electrode. It should be noted in this connection that the ionic conductivity of the spinel type lithium-titanium composite oxide is much lower than that of the carbonaceous material used as a negative electrode active material or the lithium-cobalt composite oxide, e.g., $LiCoO_2$, used as the positive electrode active material. To be more specific, the ionic conductivity of the spinel type lithium-titanium composite oxide is about one-hundredth or less of that of the carbonaceous material or the lithium-cobalt composite oxide noted above.

It should be noted that the ionic conductivity, which is increased with elevation of the temperature, is not proportional to the temperature elevation. To be more specific, within the range of 25 to 60° C., the elevation of the ionic conductivity per unit degree of temperature elevation is large around the ionic conductivity exhibited by the spinel type lithium-titanium composite oxide. On the other hand, within the range of 25 to 60° C., the elevation of the ionic conductivity per unit degree of temperature elevation is small around the ionic conductivity exhibited by the carbonaceous material or the lithium-cobalt composite oxide.

In general, the impedance of the electrode itself is rendered small with increase in the ionic conductivity. Such being the situation, the ionic conductivity of the spinel type lithium-titanium composite oxide is markedly increased with the temperature elevation and the impedance of the negative electrode itself is diminished. As a result, the polarization of the negative electrode is diminished to increase the available electric capacity.

Each embodiment of the present invention will now be described with reference to the accompanying drawings. In the following description, the overlapping explanation is omitted. The accompanying drawings are schematic drawings that are simply intended to facilitate the description and understanding of the present invention. Of course, it is possible for the shape, size, ratio, etc., shown in the drawings to differ from those of the actual apparatus. It is possible to change appropriately the design of the apparatus in view of the description given below and the known technologies.

The battery pack according to an embodiment of the present invention comprises a battery module comprising a plurality of unit cells. A nonaqueous electrolyte battery is used as the unit cell. The construction as an example of the unit cell will now be described with reference to FIGS. 1A and 1B. Specifically, FIG. 1A is a cross-sectional view schematically showing the construction of a flattened nonaqueous electrolyte battery, and FIG. 1B is cross-sectional view showing in a magnified fashion the construction of a circular region A shown in FIG. 1A.

A positive electrode terminal 1 is electrically connected to a positive electrode 3, and a negative electrode terminal 2 is electrically connected to a negative electrode 4. The positive electrode 3, the negative electrode 4 and a separator 5 interposed between the positive electrode 3 and the negative electrode 4 collectively form a flattened wound electrode 6. Since the separator 5 is interposed between the positive electrode 3 and the negative electrode 4, the negative electrode 4 and the positive electrode 3 are positioned spatially apart from each other. The wound electrode 6 is housed in a case 7 having a nonaqueous electrolyte loaded therein.

As shown in FIG. 1A, the flattened wound electrode 6 is housed in the case 7 having the nonaqueous electrolyte loaded therein. The negative electrode 2 is electrically connected to the outside and the positive electrode terminal 1 is electrically connected to the inside in the vicinity of the outer circumferential edge of the wound electrode 6. The wound electrode 6 has a laminate structure comprising the negative electrode 4, the separator 5, the positive electrode 3 and the separator 5, which are laminated one upon the other in the order mentioned, though the laminate structure is not shown in FIG. 1A.

Figure 1B:
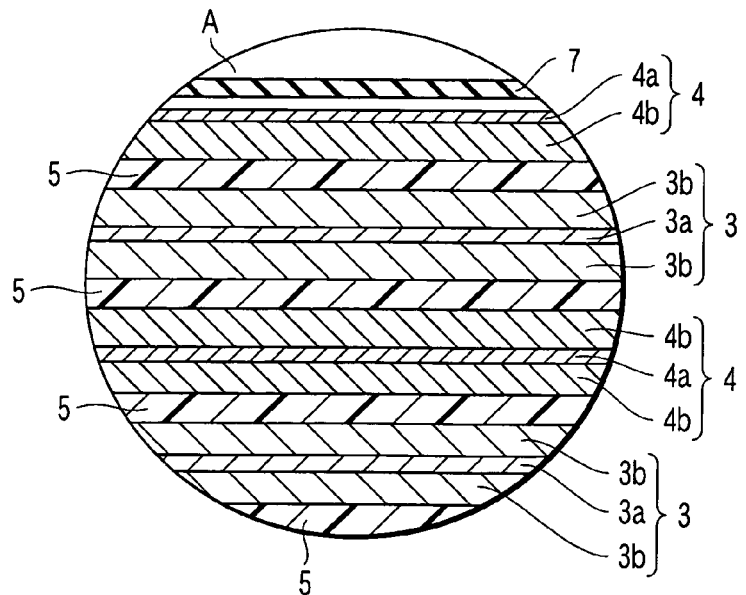
FIG. 1B is cross-sectional view showing in a magnified fashion a circular region A shown in FIG. 1A.

FIG. 1B shows more in detail the construction of the wound electrode 6. As shown in the drawing, the positive electrode 3, the negative electrode 4 and the separator 5 interposed between the positive electrode 3 and the negative electrode 4 are laminated one upon the other in the order mentioned. The negative electrode 4 constituting the outermost circumferential region comprises a negative electrode current collector 4a forming the outer layer and a negative electrode layer 4b positioned inside the negative electrode current collector 4a. Each of the other negative electrodes 4 comprises the negative electrode layer 4b, the negative electrode current collector 4a and the additional negative electrode layer 4b, which are laminated one upon the other in the order mentioned. Likewise, the positive electrode 3 comprises a positive electrode layer 3b, a positive electrode current collector 3a and another positive electrode layer 3b, which are laminated one upon the other in the order mentioned.

The negative electrode, the positive electrode, the non-aqueous electrolyte, the separator, the case, the positive electrode terminal and the negative electrode terminal will now be described in detail.

1) Negative Electrode

The available electric capacity of the negative electrode at 25° C. is larger than that of the positive electrode. The ratio X of the available electric capacity of the negative electrode at 25° C. to the available electric capacity of the positive electrode at 25° C. satisfies the condition $1.02 \leq X \leq 2$.

The available electric capacity of the positive electrode denotes an electric capacity of a half-cell using the positive electrode as a working electrode at the time when the half-cell is charged under a constant current of 0.2 C to permit the working electrode potential relative to the lithium metal to reach 4.25 V, followed by discharging the half-cell under a constant current of 0.2 C to permit the working electrode potential relative to the lithium metal to reach 3.5 V. The available electric capacity of the positive electrode at 25° C. denotes the electric capacity measured by the charge-discharge operation under the conditions given above and under a temperature environment of 25° C.

On the other hand, the available electric capacity of the negative electrode denotes an electric capacity of a half-cell using the negative electrode as a working electrode at the time when the half-cell is charged under a constant current of 0.2 C to permit the working electrode potential relative to the lithium metal to reach 1.0 V, followed by discharging the half-cell under a constant current of 0.2 C to permit the working electrode potential relative to the lithium metal to reach 2.0 V. The available electric capacity of the negative electrode at 25° C. denotes the electric capacity measured by the charge-discharge operation under the conditions given above and under a temperature environment of 25° C.

The available electric capacity A per unit area of the positive electrode at 25° C. is calculated by dividing the available electric capacity of the positive electrode at 25° C. by the area of the positive electrode. Likewise, the available electric capacity B per unit area of the negative electrode at 25° C. is calculated by dividing the available electric capacity of the negative electrode at 25° C. by the area of the negative electrode. The value obtained by dividing the available electric capacity B by the available electric capacity A denotes the ratio X of the available electric capacity of the negative electrode at 25° C. to the available electric capacity of the positive electrode at 25° C. Incidentally, where positive electrode layers are formed on both surfaces of a positive electrode current collector, the sum of the areas of the positive electrode layers formed the both surfaces of the positive electrode current collector is used as the area of the positive electrode. This is also the case with the negative electrode.

Where a plurality of unit cells are measured, the available electric capacity ratio X is calculated for each of the plural unit cells, and the calculated values are averaged to obtain the available electric capacity ratio X used herein.

If the available electric capacity ratio X is set at 1.02 or more, the voltage flat portion (plateau region) of the charge-discharge curve of the negative electrode can be expanded to reach the last period of the charge-discharge operation, with the result that the negative electrode potential at the last period of the charge-discharge operation is left unchanged and is kept constant even if the charge-discharge curve of the negative electrode is shifted by the temperature elevation. As a result, the change in the battery voltage at the last period of the charging is greatly dependent on the elevation of the positive electrode potential under any environment of temperature. In other words, the change in the battery voltage in the last period of the charging is regulated by the positive electrode. It follows that it is possible to prevent the positive electrode potential from reaching an over-charged state in the last period of the charging operation.

It should also be noted that, since the change in the positive electrode potential in the last period of the charge-discharge operation is small, compared with the change in the negative electrode potential in the last period of the charge-discharge operation, it is possible to diminish the change in the battery voltage in the last period of the charge-discharge operation under the regulation by the positive electrode. It follows that it is possible to suppress the expansion in the difference in the battery voltage among the individual unit cells at the last period of the charge-discharge operation to make it possible to avoid the difficulty that some of the unit cells are over-charged or over-discharged.

Incidentally, the large value of the available electric capacity ratio X is advantageous in diminishing the nonuniformity in the battery voltage among the unit cells. However, if the available electric capacity ratio X exceeds 2, the shortage of the battery capacity is caused to be prominent by the excessive negative electrode capacity that is not involved in the charge-discharge operation of the battery. Such being the situation, it is desirable for the available electric capacity ratio X to fall within a range of 1.02 to 2. Where the available electric capacity ratio X falls within the range noted above, it is possible to provide a battery pack excellent in the charge-discharge cycle characteristics under a wide temperature region ranging between an environment of room temperature and a high temperature environment.

It is desirable for the ratio X of the available electric capacity of the negative electrode to that of the positive electrode at 25° C. to satisfy the condition $1.03 \leq X \leq 2.0$. If the ratio X is not smaller than 1.03, the effect described above is made prominent. Also, if the ratio X is not larger than 2.0, it is possible for the utilization rate of the negative electrode to prevent from markedly lowering to make it possible to avoid the decrease of the battery capacity.

It is more desirable for the ratio X to satisfy the condition $1.03 \leq X \leq 1.44$. If the ratio X is not larger than 1.44, it is possible to avoid the decrease of the battery capacity. It is also possible to suppress the increase of the impedance caused by the increase in the thickness of the negative electrode.

The negative electrode comprises a negative electrode current collector and a negative electrode layer formed on one surface or both surfaces of the negative electrode current collector. The negative electrode layer contains a negative electrode active material, a negative electrode conductive agent and a binder.

The spinel type lithium-titanium composite oxide is used as the negative electrode active material. The spinel type lithium-titanium composite oxide includes, for example, lithium-titanium oxide having a spinel structure. The lithium-titanium oxide can be represented by the chemical formula $Li_{4+x}Ti_5O_{12}$ ($0 \leq x \leq 3$).

Figure 7:
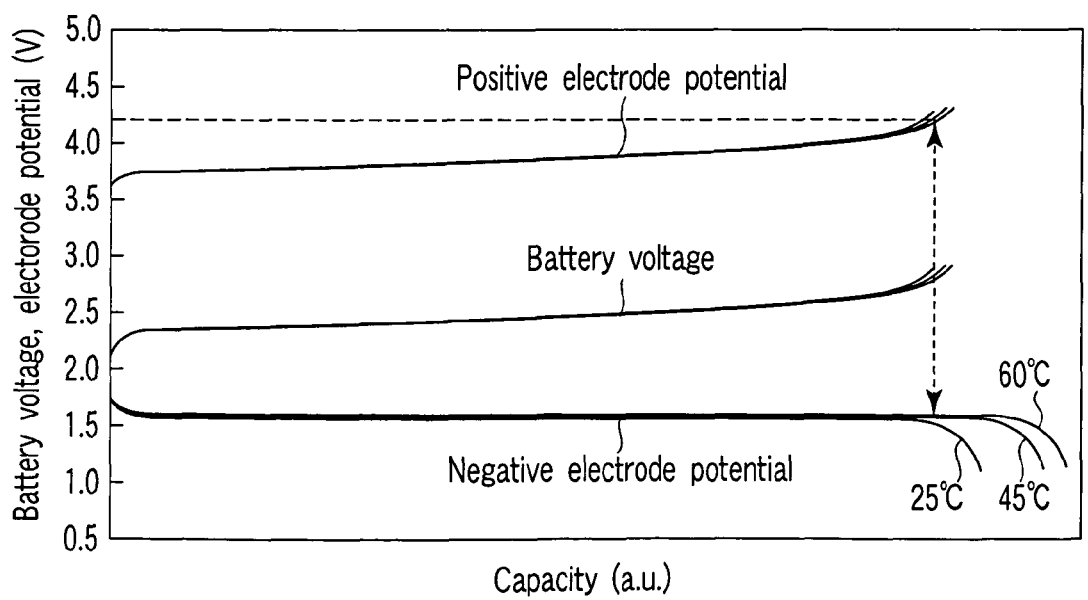
FIG. 7 is a graph showing the dependence on temperature of the charge-discharge curves of the positive electrode potential, the negative electrode potential and the battery voltage, covering the case where the ratio X of the available electric capacity of the negative electrode to the available electric capacity of the positive electrode is 1.045.

As shown in FIG. 7, the spinel type lithium-titanium composite oxide exhibits a high flatness of the charge-discharge curve except the last period of the charge-discharge operation. To be more specific, the change in the electrode potential within a range of 10% to 90% of the available electric capacity is about 0.05 V under a temperature environment of 25° C.

Therefore, if the available electric capacity of the negative electrode at 25° C. is set to fall within a range of 1.02 to 2.0 times as large as that of the positive electrode, the negative electrode potential under a 100%-charged state is not dependent on the temperature even if the charge-discharge curve is shifted in accordance with the temperature. It follows that the positive electrode potential can be controlled easily at the last period of the charging to make it possible to avoid easily the over-charged state. Also, the spinel type lithium-titanium composite oxide is small in expansion/shrinkage of the crystal lattice caused by the insertion-release reaction of lithium ions accompanying the charge-discharge operation of the battery, with the result that the battery becomes excellent in the charge-discharge cycle characteristics.

On the other hand, the ramsdellite type lithium-titanium composite oxide depicts a charge-discharge curve that is moderately lowered in accordance with the charge-discharge operation of the battery. Therefore, the negative electrode potential under a 100%-charged state is enhanced when the charge-discharge curve is shifted in accordance with the change in the temperature environment even if the available electric capacity of the negative electrode is made larger than that of the positive electrode. It follows that the positive electrode potential under a 100%-charged state is also enhanced to cause an over-charged state.

It is desirable for the negative electrode active material to have an average particle diameter not larger than 1 µm. In the case of using a negative electrode active material having an average particle diameter not larger than 1 µm, it is possible to improve the charge-discharge cycle performance of the nonaqueous electrolyte battery. Particularly, the produced effect is made prominent in the rapid charging stage and the high rate charging stage. It should be noted, however, that, if the average particle diameter is excessively small, the nonaqueous electrolyte tends to be excessively distributed on the negative electrode to bring about depletion of the nonaqueous electrolyte on the positive electrode. Such being the situation, it is desirable for the lower limit of the average particle diameter of the negative electrode active material to be set at 0.001 µm.

It is desirable for the negative electrode active material to have an average particle diameter not larger than 1 µm and a specific surface area of 5 to 50 m²/g as determined by the BET method utilizing the $N_2$ adsorption. Where the requirements described above are satisfied, it is possible to permit the negative electrode active material to be impregnated with the nonaqueous electrolyte efficiently.

The negative electrode conductive agent for enhancing the current collecting performance and for suppressing the contact resistance relative to the current collector includes, for example, acetylene black, carbon black and graphite.

The binder for bonding the negative electrode active material to the negative electrode conductive agent includes, for example, polytetrafluoroethylene (PTFE), polyvinylidene fluoride (PVdF), a fluorinated rubber and styrene-butadiene rubber.

Concerning the mixing ratio of the negative electrode active material, the negative electrode conductive agent, and the binder, it is desirable for the negative electrode active material to be used in an amount not smaller than 70% by weight and not larger than 96% by weight, for the negative electrode conductive agent to be used in an amount not smaller than 2% by weight and not larger than 28% by weight, and for the binder to be used in an amount not smaller than 2% by weight and not larger than 28% by weight. If the amount of the negative electrode conductive agent is smaller than 2% by weight, it is possible for the current collecting performance of the negative electrode layer to be lowered, with the result that the large current characteristics of the nonaqueous electrolyte battery tend to be lowered. Also, if the amount of the binder is smaller than 2% by weight, the bonding strength between the negative electrode layer and the negative electrode current collector is lowered, with the result that the charge-discharge cycle characteristics of the nonaqueous electrolyte battery tend to be lowered. On the other hand, it is desirable for the amount of each of the negative electrode conductive agent and the binder to be not larger than 28% by weight in view of the aspect of retaining a large capacity of the battery.

It is desirable for the negative electrode current collector to be formed of a material that is electrochemically stable within a potential range higher than 1.0 V. The material includes, for example, an aluminum foil and an aluminum alloy foil containing at least one element selected from the group consisting of Mg, Ti, Zn, Mn, Fe, Cu and Si.

It is desirable for the current collector of the negative electrode to be formed of aluminum foil or aluminum alloy foil. It is also desirable for the negative electrode current collector to have an average crystal grain size not larger than 50 µm. In this case, the mechanical strength of the current collector can be drastically increased to make it possible to increase the density of the negative electrode by applying the pressing under a high pressure to the negative electrode. As a result, the battery capacity can be increased. Also, since it is possible to prevent the dissolution and corrosion deterioration of the negative electrode current collector over a long over-discharge cycle under an environment of a high temperature not lower than, for example, 40° C., it is possible to suppress the elevation in the impedance of the negative electrode. Further, it is possible to improve the high-rate characteristics, the rapid charging properties, and the charge-discharge cycle characteristics of the battery. It is more desirable for the average crystal grain size of the negative electrode current collector to be not larger than 30 µm, furthermore desirably, not larger than 5 µm.

The average crystal grain size can be obtained as follows. Specifically, the texture of the current collector surface is observed with an electron microscope to obtain the number n of crystal grains present within an area of 1 mm×1 mm. Then, the average crystal grain area S is obtained from the formula "$S=1\times 10^6/n$ (µm²)", where n denotes the number of crystal grains noted above. Further, the average crystal grain size d (µm) is calculated from the area S by formula (4) given below:

$$d=2(S/\pi)^{1/2} \qquad (4)$$

The aluminum foil or the aluminum alloy foil having the average crystal grain size not larger than 50 µm can be complicatedly affected by many factors such as the composition of the material, the impurities, the process conditions, the history of the heat treatments and the heating conditions such as the annealing conditions, and the crystal grain size can be adjusted by an appropriate combination of the factors noted above during the manufacturing process.

It is desirable for the aluminum foil or the aluminum alloy foil to have a thickness not larger than 20 µm, preferably not larger than 15 µm. Also, it is desirable for the aluminum foil to have a purity not lower than 99%. Further, it is desirable for the aluminum alloy to contain, for example, magnesium, zinc and silicon. On the other hand, it is desirable for the content of the transition metals such as iron, copper, nickel and chromium in the aluminum alloy to be not higher than 1%. Where the battery pack is mounted on a vehicle, it is particularly desirable to use an aluminum alloy foil for forming the negative electrode current collector.

The negative electrode can be prepared by, for example, coating the negative electrode current collector with a slurry prepared by suspending a negative electrode active material, a negative electrode conductive agent and a binder in a general purpose solvent, followed by drying the coated suspension to form a negative electrode layer and subsequently pressing the negative electrode current collector having the negative electrode layer formed thereon. It is also possible to form a mixture of a negative electrode active material, a negative electrode conductive agent and a binder into the shape of pellets. Naturally, the pellets thus formed are used for forming the negative electrode layer.

2) Positive Electrode

It is desirable for the increase in the available electric capacity of the positive electrode accompanying the temperature elevation to be smaller than that of the negative electrode. As described previously, the deterioration in the charge-discharge cycle characteristics under an environment of a high temperature is caused by the situation that the increase in the available electric capacity of the negative electrode accompanying the temperature elevation is larger than that of the positive electrode. Incidentally, the temperature environment in this temperature elevation is assumed to range of room temperature to high temperatures.

The positive electrode comprises a positive electrode current collector and a positive electrode layer supported on one surface or both surfaces of the positive electrode current collector. The positive electrode layer contains a positive electrode active material, a positive electrode conductive agent and a binder.

A lithium-transition metal oxide having a layered crystal structure is used as the positive electrode active material.

The lithium-transition metal oxide is a metal oxide in which a metal component contains lithium and at least one transition metal element. It is desirable for the lithium-transition metal oxide to have a function of absorption and release of lithium or lithium ions.

In general, the lithium-transition metal oxide having a layered crystal structure exhibits a high ionic conductivity. As a result, the increase in the available electric capacity of the positive electrode accompanying the temperature elevation is smaller than that of the negative electrode.

It is desirable to use as the lithium-transition metal oxide having a layered crystal structure at least one oxide selected from the group consisting of a lithium-cobalt composite oxide, a lithium-nickel composite oxide and a lithium-manganese composite oxide because these composite oxides exhibit a high average operating voltage for the charge-discharge operation of the battery.

To be more specific, the lithium-transition metal oxide includes, for example, a lithium-cobalt composite oxide (e.g., $Li_xCoO_2$), a lithium-manganese composite oxide (e.g., $Li_xMnO_2$), a lithium-nickel composite oxide (e.g., $Li_xNiO_2$), a lithium-nickel-cobalt composite oxide (e.g., $LiNi_{1-y}Co_yO_2$), and a lithium-manganese-cobalt composite oxide (e.g., $LiMn_yCo_{1-y}O_2$). It is desirable for each of the molar ratios x and y in the chemical formulas given above to be 0 to 1.

Oxides having a layered crystal structure such as $Li_xCoO_2$ and $Li_xNiO_2$ are more desirable than the spinel type lithium-manganese composite oxide. The reasons for the oxides to be more desirable are as follows.

The oxide having a spinel type crystal structure such as the spinel type lithium-manganese composite oxide and the lithium-transition metal oxide having a layered crystal structure (hereinafter referred to as "layered-crystal oxide") are described in comparison with each other.

In the spinel type lithium-manganese composite oxide, e.g., $Li_xMn_2O_4$, the charge-discharge operation is repeated with the molar ratio x of Li held within a range satisfying $0 \leq x \leq 1$. Where the lithium molar ratio x is held within a range of 0 to 1, the composite oxide has a stable chemical structure. In other words, the spinel type lithium-manganese composite oxide permits maintaining a good reversibility between the insertion reaction and the release reaction of the lithium ions even under the state that the molar ratio of lithium is close to zero. However, in the end period of the charging, lithium is withdrawn from the composite oxide noted above so as to cause the molar ratio of lithium in the composite oxide to be lowered to zero, with the result that the positive electrode potential is changed sharply in the end period of charging. The oxide having an olivine structure, e.g., $LiFePO_4$ disclosed in Japanese Patent Disclosure No. 2004-171955 referred to previously, also has a wide range of the lithium molar ratio within which a good reversibility is maintained between the insertion reaction and the release reaction of the lithium ions. As a result, the oxide having the olivine structure also tends to be changed easily into the state under which lithium is withdrawn completely in the end period of the charging so as to cause the potential of the positive electrode to be changed sharply in the end period of the charging. Such being the situation, in the case of using the oxide having the spinel type crystal structure or the oxide having the olivine type crystal structure, the battery voltage is changed sharply in the end period of the charging even if the available electric capacity ratio X is set to fall within a range of 1.02 to 2.

If the layered-crystal oxide represented by $Li_xCoO_2$ is charged to permit the lithium molar ratio x to satisfy $0 \leq x \leq 0.5$, the crystal structure is changed to markedly lower the reversibility. It follows that in order to maintain the charge-discharge cycle performance in such a layered-crystal oxide, it is desirable to control the charge-discharge operation such that the molar ratio x falls within a range satisfying $0.5 \leq x \leq 1$. If the molar ratio x is smaller than 0.5 even if slightly, the crystal structure of $Li_xCoO_2$ is changed from the hexagonal system into the monoclinic system. On the other hand, in view of the increase in the capacity, it is desirable for the composite oxide to be fully charged, i.e., to be charged until the molar ratio x is changed to 0.5. In order to satisfy both of these requirements simultaneously, it is desirable to control the charge-discharge operation in a manner to change the molar ratio x from 0.5 to 1. In the battery pack according to this embodiment of the present invention, it is difficult for the positive electrode to be charged to reach an over-charged state and, thus, the molar ratio x of lithium can be controlled easily to realize a stable charge-discharge cycle performance.

Similarly, in the case of $Li_xNiO_2$, the crystal structure is changed if the battery is charged to cause the lithium molar ratio x to be made smaller than 0.3. Such being the situation, it is desirable to control the charge-discharge operation such that the molar ratio x is changed in this case from 1 toward 0.3. In the battery pack according to this embodiment of the present invention, it is possible to control the over-charging of the positive electrode to make it possible to control easily the molar ratio x of lithium to satisfy $0.3 \leq x \leq 1$, thereby realizing satisfactory charge-discharge cycle characteristics.

Incidentally, the upper limit of the charging potential of the positive electrode that contains a layered-crystal oxide such as $Li_xCoO_2$ or $Li_xNiO_2$ is about 4.25 V, if the upper limit of the charging potential of the positive electrode is controlled to the lower limit of the range of the molar ratio x described above.

As described above, the range in which a good reversibility can be maintained between the insertion reaction and the release reaction of the lithium ions is limited in the layered-crystal oxide. It follows that in the case of using the positive electrode using the layered-crystal oxide, the charge ratio is increased to reach 100% before the value of the lithium molar ratio is decreased to a level substantially equal to zero. Such being the situation, it is possible to retard the change of the lithium molar ratio to zero, i.e., the change into the state that the lithium ions are withdrawn completely, so as to make the change of the positive electrode potential sufficiently smaller than the change of the negative electrode potential in the end period of the charging. It follows that it is possible to diminish the change of the battery voltage in the end period of the charging.

The layered crystal structure includes, for example, a layered halite type structure.

The lithium-transition metal oxide can be represented by the structural formula of $Li_yM1_{z1}M2_{z2}O_2$, where M1 denotes at least one element selected from the group consisting of Co, Ni, and Mn, M2 denotes at least one element selected from the group consisting of Fe, Al, B, Ga and Nb, and $0 \leq y \leq 1.2$, $0.98 \leq z1+z2 \leq 1.2$, $0 \leq z2 \leq 0.2$. It is desirable for the mole amount of Ni to be not larger than 0.85 (including 0.0) based on the sum of the mole amount of M1 and M2. The sum of the mole amount of M1 and M2 is supposed to be 1.

M1 is selected from the group consisting of Co, Ni and Mn as described above.

M2, which is an element partly substituting M1, is added appropriately in accordance with the desired properties of the nonaqueous electrolyte battery. It is desirable for the substituting element to be selected from the group consisting of Fe, Al, B, Ga and Nb. It is particularly desirable to use Al as the substituting element because Al permits decreasing the film resistance at the interface between the positive electrode and the liquid nonaqueous electrolyte to stabilize the crystal structure of the active material.

The lithium-transition metal oxide, in which the molar ratios y, z1 and z2 fall within the ranges given above, is particularly excellent in the charge-discharge cycle characteristics.

As described above, it is desirable for the Ni amount to be not larger than 0.85 (including 0.0) based on the sum of M1 and M2. It should be noted that each of the lithium-cobalt composite oxide and the lithium-manganese composite oxide exhibits an ionic conductivity about 100 times as high as that of the spinel type lithium-titanium composite oxide. Also, the dependence of the available electric capacity on temperature is small in the lithium-cobalt composite oxide and the lithium-manganese composite oxide. It follows that the particular effect described above, which is inherent in this embodiment of the present invention, is produced prominently in the case of using the lithium-cobalt composite oxide and the lithium-manganese composite oxide. On the other hand, the lithium-nickel composite oxide is somewhat inferior in its ionic conductivity to the lithium-cobalt composite oxide and the lithium-manganese composite oxide.

It follows that, where at least one element selected from the group consisting of Co, Ni and Mn is selected as the main transition metal, the ionic conductivity is lowered with increase in the Ni amount to increase the dependence on temperature of the available electric capacity. The temperature dependence of the available electric capacity of the positive electrode using a lithium-nickel composite oxide is not larger than that of the negative electrode using the spinel type lithium-titanium composite oxide. However, it is not appropriate to increase the Ni amount. Such being the situation, it is desirable for the Ni amount to be not larger than 0.85 based on the sum of M1 and M2.

It should also be noted that the lithium-transition metal oxide represented by $Li_yM1_{z1}M2_{z2}O_2$ belongs to a layered-crystal oxide. Therefore, if the lithium-transition metal oxide is used in the battery pack according to this embodiment of the present invention, the deterioration caused by the over-charging is avoided to realize good charge-discharge cycle characteristics.

The positive electrode conductive agent for enhancing the current collecting performance and for suppressing the contact resistance relative to the current collector, includes, for example, a carbonaceous material such as acetylene black, carbon black and graphite.

The binder for bonding the positive electrode active material to the positive electrode conductive agent includes, for example, polytetrafluoroethylene (PTFE), polyvinylidene fluoride (PVdF), and a fluorinated rubber.

Concerning the mixing ratio of the positive electrode active material, the positive electrode conductive agent and the binder, it is desirable for the positive electrode active material to be used in an amount not smaller than 80% by weight and not larger than 95% by weight, for the positive electrode conductive agent to be used in an amount not smaller than 3% by weight and not larger than 18% by weight, and for the binder to be used in an amount not smaller than 2% by weight and not larger than 17% by weight. If the mixing amount of the positive electrode conductive agent is not smaller than 3% by weight, it is possible to obtain the effect described above. Also, if the mixing amount of the positive electrode conductive agent is not larger than 18% by weight, it is possible to suppress the decomposition of the nonaqueous electrolyte on the surface of the positive electrode conductive agent during storage of the battery pack under a high temperature. Further, if the mixing amount of the binder is not smaller than 2% by weight, it is possible to obtain a sufficient electrode strength. Also, if the mixing amount of the binder is not larger than 17% by weight, it is possible to decrease the mixing amount of an insulator in the electrode to decrease the internal resistance of the battery.

It is desirable for the positive electrode current collector to be formed of an aluminum foil or an aluminum alloy foil containing at least one element selected from the group consisting of Mg, Ti, Zn, Mn, Fe, Cu and Si.

The positive electrode can be prepared by, for example, coating a positive electrode current collector with a suspension prepared by suspending a positive electrode active material, a positive electrode conductive agent and a binder in a suitable solvent, followed by drying the coated suspension to form a positive electrode layer on the positive electrode current collector and subsequently pressing the positive electrode current collector having the positive electrode layer formed thereon. It is also possible to form a mixture of a positive electrode active material, a positive electrode conductive agent and a binder into the shape of pellets. In this case, the pellets thus formed is used for forming the positive electrode layer.

3) Nonaqueous Electrolyte

The nonaqueous electrolyte includes a liquid nonaqueous electrolyte prepared by dissolving an electrolyte in an organic solvent and a gel-like composite nonaqueous electrolyte prepared by adding a polymer material to a liquid nonaqueous electrolyte.

The liquid nonaqueous electrolyte can be prepared by dissolving an electrolyte in an organic solvent in a concentration of 0.5 to 2.5 mol/L.

The electrolyte includes, for example, lithium salts such as lithium perchlorate ($LiClO_4$), lithium hexafluoro phosphate ($LiPF_6$), lithium tetrafluoro borate ($LiBF_4$), lithium hexafluoro arsenate ($LiAsF_6$), lithium trifluoro metasulfonate ($LiCF_3SO_3$), bis-trifluoromethyl sulfonyl imide lithium [$LiN(CF_3SO_2)_2$], and a mixture thereof. It is desirable for the electrolyte to be unlikely to be oxidized even under a high potential. It is most desirable to use $LiPF_6$ as the electrolyte.

The organic solvent includes, for example, cyclic carbonates such as propylene carbonate (PC), ethylene carbonate (EC), and vinylene carbonate (VC); linear carbonates such as diethyl carbonate (DEC), dimethyl carbonate (DMC), and methyl ethyl carbonate (MEC); cyclic ethers such as tetrahydrofuran (THF), 2-methyl tetrahydrofuran (2Me THF), and dioxolane (DOX); linear ethers such as dimethoxy ethane (DME), and diethoxy ethane (DEE); as well as γ-butyrolactone (GBL), acetonitrile (AN) and sulfolane (SL). These organic solvents can be used singly or in the form of a mixture of a plurality of these organic solvents.

It is particularly desirable to use a mixed solvent containing at least two of the organic solvents selected from the group consisting of propylene carbonate (PC), ethylene carbonate (EC) and γ-butyrolactone (GBL).

The polymer material for preparing the gel-like composite nonaqueous electrolyte includes, for example, polyvinylidene fluoride (PVdF), polyacrylonitrile (PAN), and polyethylene oxide (PEO).

It is also possible to use a room temperature molten salt (ionic liquid) containing lithium ions, a polymer solid electrolyte, or an inorganic solid electrolyte as the nonaqueous electrolyte.

The room temperature molten salt (ionic liquid) denotes a compound, which can be present in the form of a liquid material under room temperature (e.g., 15° C. to 25° C.) and which contains an organic cation and an organic anion. The room temperature molten salt (ionic liquid) noted above includes, for example, a molten salt that can be present in the form of a liquid material, a molten salt that can be converted into a liquid material when mixed with an electrolyte, and a molten salt that can be converted into a liquid material when dissolved in an organic solvent. Incidentally, it is desirable for the room temperature molten salt to have a melting point not higher than 25° C. Also, it is desirable for the organic cation forming the molten salt to have a quaternary ammonium skeleton.

The polymer solid electrolyte can be prepared by dissolving an electrolyte in a polymer material, followed by solidifying the resultant solution.

Further, the inorganic solid electrolyte is a solid material exhibiting a lithium ion conductivity.

4) Separator

The separator includes, for example, a porous film including polyethylene, polypropylene, cellulose and/or polyvinylidene fluoride (PVdF), and an unwoven fabric made of a synthetic resin. Particularly, it is desirable in view of the improvement in safety to use a porous film made of polyethylene or polypropylene because the particular porous film can be melted under a prescribed temperature to break the current.

5) Case

The case is formed of a laminate film having a thickness of, for example, 0.2 mm or less, or a metal sheet having a thickness of, for example, 0.5 mm or less. It is more desirable for the metal sheet to have a thickness of 0.2 mm or less. Also, the case has a flattened shape, an angular shape, a cylindrical shape, a coin shape, a button shape or a sheet shape, or is of a laminate type. The case includes a case of a large battery mounted on, for example, an electric automobile having two to four wheels in addition to a small battery mounted on a portable electronic device.

The laminate film includes, for example, a multi-layered film including a metal layer and a resin layer covering the metal layer. For decreasing the weight of the battery, it is desirable for the metal layer included in the multi-layered film to be formed of an aluminum foil or an aluminum alloy foil. On the other hand, the resin layer for reinforcing the metal layer is formed of a polymer material such as polypropylene (PP), polyethylene (PE), Nylon, and polyethylene terephthalate (PET). The laminate film case can be obtained by bonding the periphery of superposed laminate films by thermal fusion.

It is desirable for the metal case to be formed of aluminum or an aluminum alloy. Also, it is desirable for the aluminum alloy to be an alloy containing an element such as magnesium, zinc or silicon. On the other hand, it is desirable for the amount of the transition metals, which are contained in the aluminum alloy, such as iron, copper, nickel and chromium, to be not larger than 100 ppm.

6) Positive Electrode Terminal

The positive electrode terminal is formed of a material exhibiting an electrical stability and conductivity within the range of 3.0 to 4.25 V of the potential relative to the lithium metal. To be more specific, the material used for forming the positive electrode terminal includes, for example, aluminum and an aluminum alloy containing at least one element selected from the group consisting of Mg, Ti, Zn, Mn, Fe, Cu and Si. In order to lower the contact resistance relative to the positive electrode current collector, it is desirable for the positive electrode terminal to be formed of a material equal to the material used for forming the positive electrode current collector.

7) Negative Electrode Terminal

The negative electrode terminal is formed of a material exhibiting an electrical stability and conductivity within the range of 1.0 to 3.0 V of the potential relative to the lithium metal. To be more specific, the material used for forming the negative electrode terminal includes, for example, aluminum and an aluminum alloy containing at least one element selected from the group consisting of Mg, Ti, Zn, Mn, Fe, Cu and Si. In order to lower the contact resistance relative to the negative electrode current collector, it is desirable for the negative electrode terminal to be formed of a material equal to the material used for forming the negative electrode current collector.

The battery pack according to the embodiment of the present invention comprises a plurality of unit cells described previously. These plural unit cells are electrically connected to each other in series or in parallel to form a battery module.

It is desirable for the unit cell to have a rated capacity not smaller than 2 Ah and not larger than 100 Ah. It is more desirable for the rated capacity of the unit cell to be not smaller than 3 Ah and not larger than 40 Ah. Further, it is desirable for the unit cell mounted to a hybrid automobile to have a rated capacity not smaller than 3 Ah and not larger than 15 Ah and for the unit cell for an electric automobile and an uninterruptible power supply device (UPS) to have a rated capacity not smaller than 15 Ah and not larger than 40 Ah.

Incidentally, the term "rated capacity" denotes the capacity under the condition that the unit cell is discharged under a current of 0.2 C.

It suffices to use at least two unit cells for forming a battery pack. However, it is desirable to use at least 5 unit cells and not more than 500 unit cells. It is more desirable to use at least 5 unit cells and not more than 200 unit cells. Further, when it comes to the battery pack mounted on a hybrid automobile or an electric automobile, it is desirable for the battery pack to include at least 5 unit cells and not more than 200 unit cells and for the battery pack used in UPS to include at least 5 unit cells and not more than 1,000 unit cells. Also, when it comes to a battery pack mounted on a vehicle, it is desirable for the unit cells to be connected in series to obtain a high voltage.

The unit cell described above is adapted for use in the preparation of a battery module. Also, the battery pack according to the embodiment of the present invention is excellent in the charge-discharge cycle characteristics, as described in the following.

The change in potential of the positive electrode containing a lithium-transition metal oxide that has a layered crystal structure is moderate at the last period of the charge-discharge operation, compared with that of the negative electrode containing a lithium-titanium composite oxide. In other words, a change in the electrode potential within 95% to 100% of the available electric capacity for the positive electrode is smaller than that for the negative electrode under a temperature environment of 25° C.

As described above, the change in the battery voltage in the last period of the charging operation is regulated by the positive electrode under a temperature environment not lower than room temperature. This is also the case with last period of the discharging operation. It follows that the change in the battery voltage in the last period of the charge-discharge operation becomes moderate by the positive electrode regulation for this embodiment of the present invention, compared with the negative electrode regulation. It follows that it is possible to diminish the difference in the battery voltage among the individual batteries, which is derived from the difference in the battery capacity among the individual batteries, in the last period of the charge-discharge operation. The battery module, in which the difference in the battery voltage among the individual batteries is small, permits improving the charge-discharge cycle characteristics.

The particular mechanism will now be described with reference to FIGS. 4 and 5, covering as an example the change in the battery voltage in the last period of the charging operation in the battery module prepared by connecting a plurality of batteries in series.

In general, a difference in the battery capacity, which is derived from the nonuniformity in the active material loading amount, is generated among the individual batteries, though the difference in the battery capacity is also dependent on the manufacturing method of the battery.

Figure 4:
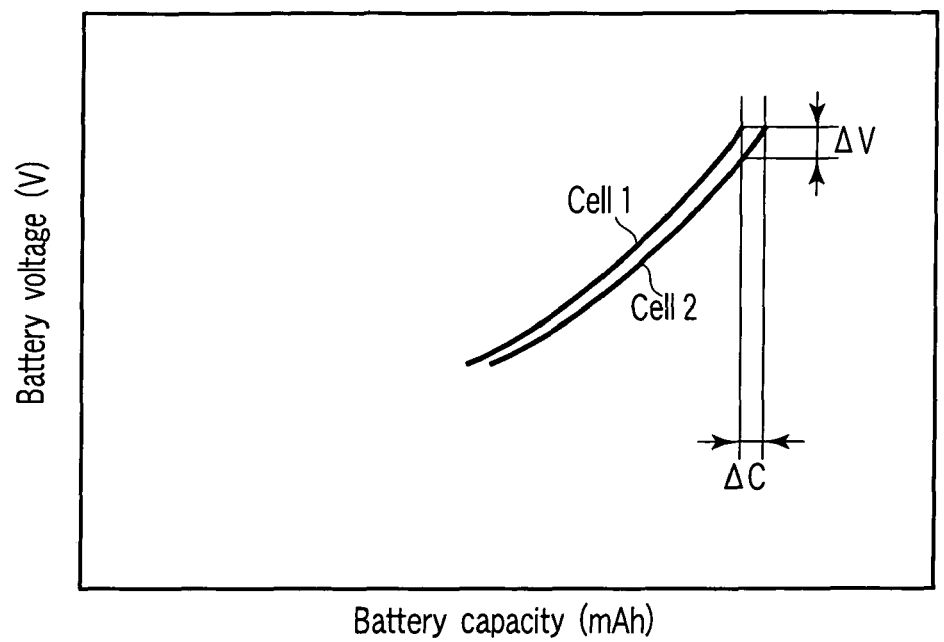
FIG. 4 is a graph showing the relationship between the battery capacity and the battery voltage in the battery module of the series connection, covering the case where the change of the battery voltage in the last period of the charging is regulated by the positive electrode.

In FIG. 4, two cells, i.e., cell 1 and cell 2 are connected in series. Cell 1 and cell 2 differ from each other in the battery capacity (the difference in the battery capacity being hereinafter referred to as the nonuniformity $\Delta C$ of the capacity). Since the same current flows through cell 1 and cell 2, a difference in the battery voltage (hereinafter referred to as $\Delta V$) is derived from the nonuniformity $\Delta C$ of the capacity.

In the case of the positive electrode regulation, the change in voltage is moderate in the last period of the charging operation and, thus, the difference in the battery voltage ($\Delta V$) derived from the nonuniformity $\Delta C$ of the capacity is small as shown in FIG. 4.

Figure 5:
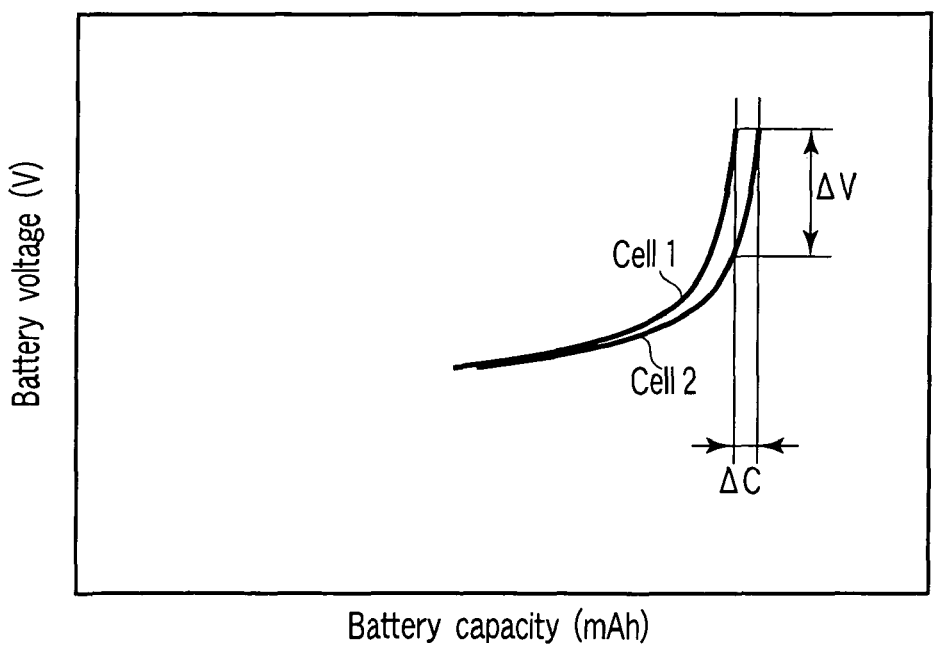
FIG. 5 is a graph showing the relationship between the battery capacity and the battery voltage in the battery module of the series connection, covering the case where the change of the battery voltage in the last period of the charging is regulated by the negative electrode.

On the other hand, when it comes to the negative electrode regulation, the change is voltage is sharp in the last period of the charging operation, with the result that the difference in the battery voltage ($\Delta V$) derived from the nonuniformity $\Delta C$ of the capacity becomes large, as shown in FIG. 5. If the difference in the battery voltage ($\Delta V$) derived from the nonuniformity $\Delta C$ of the capacity is large, the charge-discharge cycle life is shortened by the over-charging, and an over-discharge proceeds to arrive finally at reversal. As a result, the battery performance is markedly impaired.

On the other hand, where the positive electrode contains the lithium-manganese composite oxide having the spinel type crystal structure, the change of potential in the charge-discharge curve of the positive electrode is substantially equal to or sharper than that of the negative electrode containing the lithium-titanium composite oxide. In other words, the change of the positive electrode in the electrode potential under an environment of 25° C. within a range of 95% to 100% of the available electric capacity is substantially equal to or larger than that of the negative electrode. It follows that, if the available electric capacity ratio X falls within a range of 1.02 to 2, the battery voltage is defined by the positive electrode potential. In this case, however, the battery voltage is changed sharply in the end period of the charging as in the case where the battery voltage is defined by the negative electrode potential. The voltages of the unit cells constituting the battery pack are rendered nonuniform because of the difference in the battery voltage among the individual unit cells, and the nonuniformity is further enlarged in the end period of the charging. The similar problem is generated even in the case where a metal oxide having the olivine structure is used in the positive electrode.

The embodiment of the unit cell adapted for use for the manufacture of the battery module will now be described.

As described previously, the lithium-transition metal oxide used as the positive electrode active material can be represented by the composition formula $Li_yM1_{z1}M2_{z2}O_2$ (where M1 denotes at least one element selected from the group consisting of Co, Ni and Mn, M2 denotes at least one element selected from the group consisting of Fe, Al, B, Ga and Nb, and $0 \leq y \leq 1.2$, $0.98 \leq z1+z2 \leq 1.2$, $0 \leq z2 \leq 0.2$.

It is more desirable for the amount of Ni to be at least 0.3 based on the sum of M1 and M2. In this case, M1 denotes Ni or a combination of Ni and at least one element selected from the group consisting of Co and Mn.

If the amount of Ni is not smaller than 0.3 based on the sum of M1 and M2, it is possible to improve the flatness of the positive electrode voltage at the last period of the charge-discharge operation. In other words, it is possible to diminish the change in the positive electrode voltage in the last period of the charge-discharge operation. As a result, the difference in voltage ($\Delta V$) derived from the difference in the battery capacity (hereinafter referred to as the nonuniformity $\Delta C$ of the capacity) referred to above can be further diminished to further improve the charge-discharge cycle characteristics.

An example of the battery pack according to this embodiment of the present invention will now be described with reference to FIGS. 2 and 3.

FIG. 2 is an oblique view showing in a dismantled fashion the construction of the battery pack according to one embodiment of the present invention.

As shown in FIG. 2, a plurality of plate-like unit cells 11, e.g., 8 unit cells 11, are laminated one upon the other to form a parallelepiped laminate body 20 forming a battery module. As described previously, each of the unit cells 11 is constructed such that the positive electrode terminal 13 and the negative electrode terminal 14 connected to the positive electrode and the negative electrode, respectively, are withdrawn to the outside of the case. A printed wiring board 12 is arranged on the side toward which the positive electrode terminal 13 and the negative electrode terminal 14 are allowed to protrude.

The positive electrode terminal 13 is electrically connected to a connector 16 on the side of the positive electrode via a wiring 15 on the side of the positive electrode. Likewise, the negative electrode terminal 14 is electrically connected to a connector 18 on the side of the negative electrode via a wiring 17 on the side of the negative electrode. The connectors 16, 18 on the side of the positive electrode and the negative electrode, respectively, are connected to the counterpart connectors mounted to the printed wiring board 12.

The laminate body 20 of the unit cells 11 is fixed by adhesive tapes 19. Protective sheets 21 each formed of rubber or a resin are arranged to cover the three side surfaces of the laminate body 20 except the side toward which protrude the positive electrode terminal 13 and the negative electrode terminal 14. Also, a protective block 22 formed of rubber or a resin is arranged in the clearance between the side of the laminate body 20 and the printed wiring board 12.

The laminate body 20 is housed in a housing vessel 23 together with the protective sheets 21, the protective block 22 and the printed wiring board 12. Also, a lid 24 is mounted to close the upper open portion of the housing vessel 23.

Each constituent of the battery pack according to this embodiment of the present invention will now be described in detail.

Figure 3:
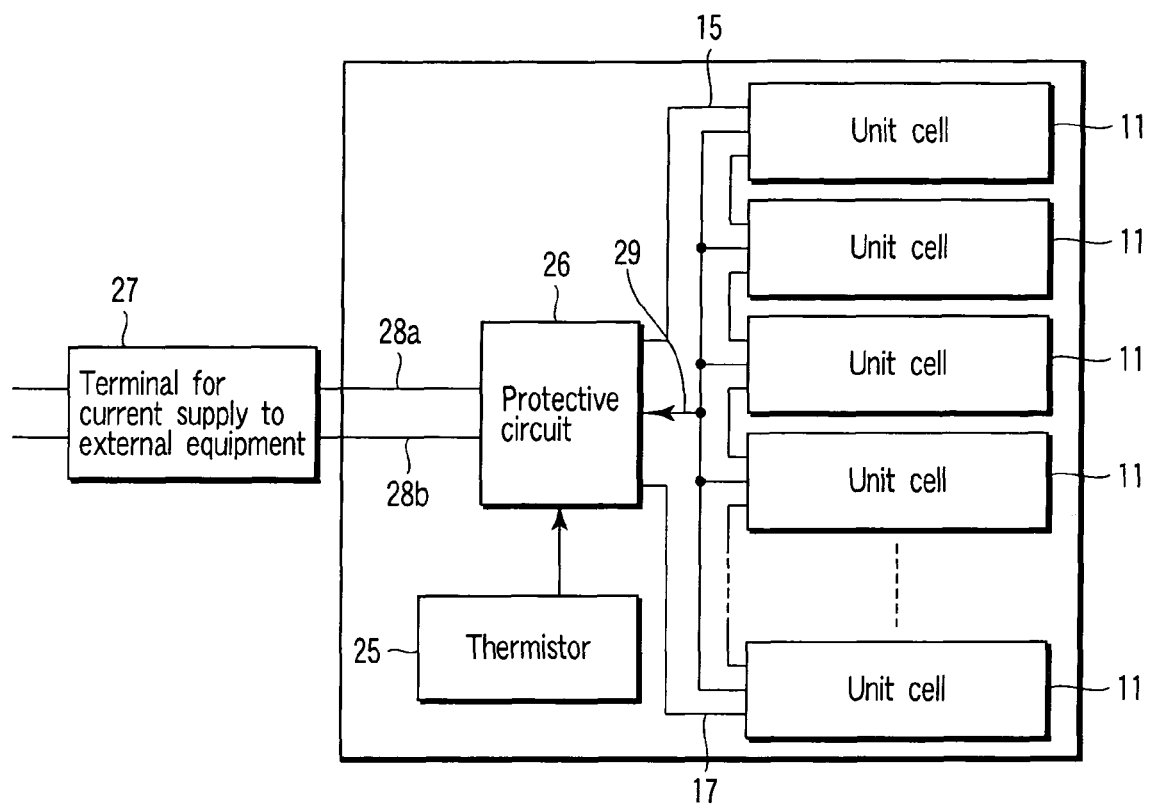
FIG. 3 is a block diagram showing the electric circuit of the battery pack according to an embodiment of the present invention.

As shown in FIG. 3, a thermistor 25, a protective circuit 26, and a terminal 27 for the current supply to the external apparatus are mounted to the printed wiring board 12.

The thermistor 25 serves to detect the temperature of the unit cell 11. The signal denoting the detected temperature is transmitted to the protective circuit 26.

As shown in FIG. 3, the protective circuit 26 is capable of breaking under prescribed conditions wirings 28a and 28b stretched between the protective circuit 26 and the terminal 27 for the current supply to the external apparatus. The prescribed conditions noted above include, for example, the case where the temperature detected by the thermistor 25 is higher than a prescribed temperature and the case of detecting, for example, the over-charging, the over-discharging and the over current of the unit cell 11. In the case of detecting the unit cells 11, it is possible to detect the battery voltage, the positive electrode potential or the negative electrode potential. Incidentally, in the case of detecting the electrode potential, a lithium electrode used as a reference electrode is inserted into the unit cell 11. In the case of FIG. 3, the protective circuit 26 is provided with a battery voltage monitoring circuit section. Each of the unit cells 11 is connected to the battery voltage monitoring circuit section via a wiring 29. According to the particular construction, the battery voltage of each of the unit cells 11 can be detected by the protective circuit 26. Incidentally, FIG. 3 covers the case of applying the detection to the individual unit cells 11. However, it is also possible to apply the detection to the battery module 20.

Further, in the case shown in FIG. 3, all the unit cells 11 included in the battery module 20 are detected in terms of voltage. Although it is particularly preferable that the voltages of all of the unit cells 11 of the battery module 20 should be detected, it may be sufficient to check the voltages of only some of the unit cells 11.

The battery pack according to the embodiment of the present invention is excellent in the control of the positive electrode potential or the negative electrode potential by the detection of the battery voltage and, thus, is particularly adapted for the case where the protective circuit detects the battery voltage.

It is possible to use a thermally shrinkable tape in place of the adhesive tape 19. In this case, the protective sheets 21 are arranged on both sides of the laminate body 20 and, after the thermally shrinkable tube is wound about the protective sheets 21, the thermally shrinkable tube is thermally shrunk to bond the laminate body 20.

Incidentally, FIG. 2 shows that the unit cells 11 are connected in series. However, it is also possible to connect the unit cells 11 in parallel to increase the capacity of the battery pack. Of course, it is also possible to connect the assembled battery packs in series and in parallel.

The embodiment of the battery pack can be changed appropriately depending on the use of the battery pack.

It is desirable for the battery pack according to this embodiment of the present invention to be assumed for use under a high temperature environment. To be more specific, the battery pack can be mounted on a vehicle such as a hybrid electric automobile having two to four wheels, an electric automobile having two to four wheels, and an assist bicycle. Also, the battery pack can be used for the emergency power supply of an electronic apparatus.

Where the battery pack is mounted on a vehicle, the battery pack is required to exhibit satisfactory charge-discharge cycle characteristics under a high temperature environment of about 60° C. When used for the emergency power supply of an electronic apparatus, the battery pack is required to exhibit satisfactory charge-discharge cycle characteristics under a high temperature environment of about 45° C.

Figure 9:
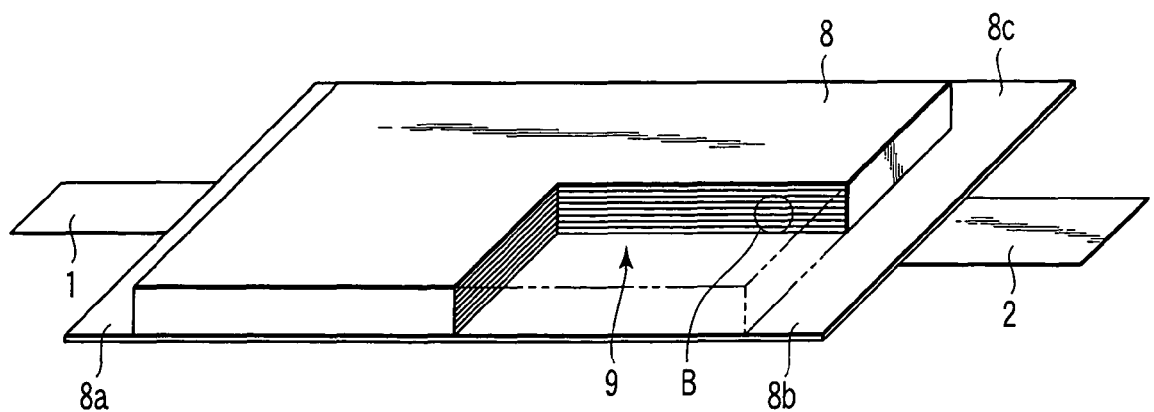
FIG. 9 is an oblique view, partly broken away, schematically showing as another example the construction of a unit cell used in the battery pack shown in FIG. 2.
Figure 10:
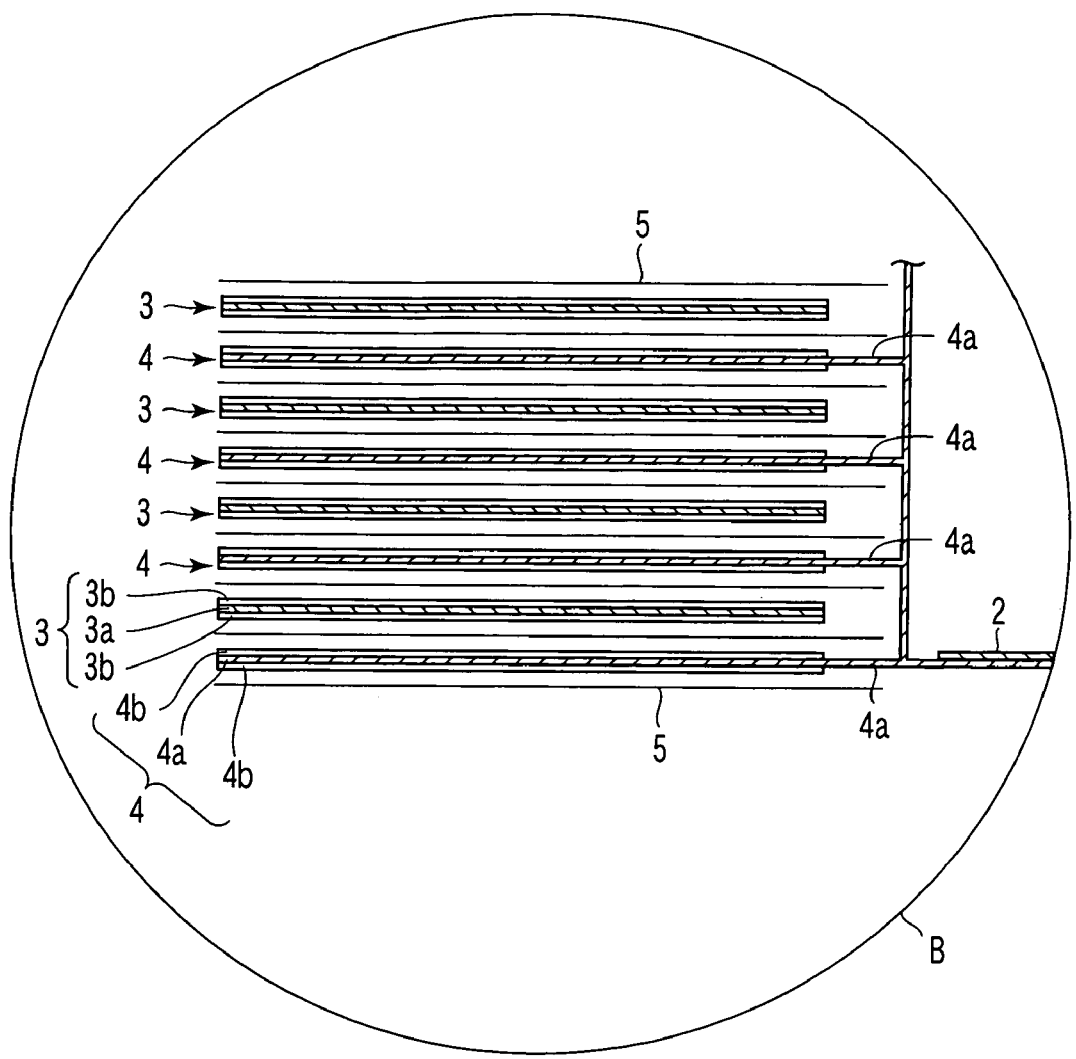
FIG. 10 is a cross-sectional view showing in a magnified fashion the construction of a circular region B shown in FIG. 9.

The unit cell 11 included in the battery pack shown in FIGS. 2 and 3 is formed of the flattened type nonaqueous electrolyte battery constructed as shown in FIG. 1. However, the unit cell forming the battery pack is not limited to the battery of the type shown in FIG. 1. It is also possible to use, for example, the flattened type nonaqueous electrolyte battery shown in FIGS. 9 and 10 for forming the battery pack. FIG. 9 is an oblique view, partly broken away, schematically showing the construction of another example of the unit cell used in the battery pack shown in FIG. 2, and FIG. 10 is a cross-sectional view showing in a magnified fashion the circular portion B shown in FIG. 9.

As shown in FIG. 9, a laminate type electrode group 9 is housed in a case 8 formed of a laminate film. The case 8 has a first sealing section 8a formed at one edge of a peripheral portion, a second sealing section 8b formed at an edge portion opposed to said one edge, and a third sealing section 8c formed at an edge portion in a longitudinal direction. The first sealing section 8a, second sealing section 8b and third sealing section 8c are formed by heat sealing. As shown in FIG. 10, the laminate type electrode group 9 comprises a positive electrode 3 and a negative electrode 4, which are laminated one upon the other with a separator 5 interposed between the positive electrode 3 and the negative electrode 4. Each of a plurality of positive electrodes 3 includes a positive electrode current collector 3a and positive electrode layers 3b formed on both surfaces of the positive electrode current collector 3a and containing a positive electrode active material. Likewise, each of a plurality of negative electrodes 4 includes a negative electrode current collector 4a and negative electrode layers 4b formed on both surfaces of the negative electrode current collector 4a and containing a negative electrode active material. One side of the negative electrode current collector 4a included in each negative electrode 4 protrudes from the positive electrode 3. The negative electrode current collector 4a protruding from the positive electrode 3 is electrically connected to a band-like negative electrode terminal 2. The distal end portion of the band-like negative electrode terminal 2 is withdrawn from the second sealing section 8b of the case 8 to the outside. Also, one side of the positive electrode current collector 3a included in the positive electrode 3 is positioned on the side opposite to the protruding side of the negative electrode current collector 4a and is protruded from the negative electrode 4, though the particular construction is not shown in the drawing. The positive electrode current collector 3a protruding from the negative electrode 4 is electrically connected to a band-like positive electrode terminal 1. The distal end portion of the band-like positive electrode terminal 1 is positioned on the side opposite to the side of the negative electrode terminal 2 and is withdrawn from the first sealing section 8a of the case 8 to the outside.

Examples of the present invention will now be described. Of course, the technical scope of the present invention is not limited to the following Examples as far as the subject matter of the present invention is not exceeded.

CHARGE-DISCHARGE CYCLE TEST 1

Example 1

Preparation of Positive Electrode

In the first step, prepared was a slurry by adding 90% by weight of a lithium-cobalt composite oxide powder represented by $LiCoO_2$ and having a layered halite type crystal structure, which was used as the positive electrode active material, 5% by weight of acetylene black used as a conductive agent, and 5% by weight of polyvinylidene fluoride (PVdF) used as a binder, to N-methyl pyrrolidone (NMP), followed by coating both surfaces of a current collector formed of an aluminum foil having a thickness of 15 μm with the slurry thus prepared and subsequently drying and, then, pressing the current collector having the dried slurry coated thereon to obtain a positive electrode having an electrode density of 3.3 $g/cm^3$.

The available electric capacity of the positive electrode at 25° C. was found to be 1.250 $mAh/cm^2$.

<Preparation of Negative Electrode>

Prepared was a slurry by adding 90% by weight of lithium titanate powder represented by $Li_4Ti_5O_{12}$ and having a spinel structure, which was used as the negative electrode active material, 5% by weight of coke baked at 1,200° C., and having the lattice spacing $d_{002}$ of 0.3465 nm and an average particle diameter of 3 μm, which was used as the conductive agent, and 5% by weight of polyvinylidene fluoride (PVdF) used as a binder, to N-methyl pyrrolidone (NMP), followed by coating both surfaces of an aluminum foil having a thickness of 15 μm, which was used as a current collector, with the slurry thus prepared and subsequently drying and, then, pressing the current collector coated with the dried slurry to obtain a negative electrode having an electrode density of 2.0 $g/cm^3$.

The available electric capacity of the negative electrode at 25° C. was found to be 1.275 $mAh/cm^2$.

The average particle diameter of the lithium-titanium composite oxide powder was measured as follows.

Specifically, about 0.1 g of a sample, a surfactant, and 1 to 2 mL of a distilled water were put in a beaker, and the distilled water was sufficiently stirred, followed by pouring the stirred system in a stirring water vessel. Under this condition, the light intensity distribution was measured every 2 seconds and measured 64 times in total by using SALD-300, which is a Laser Diffraction Particle Size Analyzer manufactured by Shimadzu Corporation, to analyze the particle size distribution data.

<Preparation of Electrode Group>

A laminate structure comprising the positive electrode, a separator formed of a porous polyethylene film, the negative electrode, and another separator, which were laminated one upon the other in the order mentioned, was spirally wound, followed by pressing the wound laminate structure at 90° C. to obtain a flattened electrode group having a width of 30 mm, and a thickness of 3.0 mm. The electrode group thus prepared was housed in a pack formed of a laminate film having a thickness of 0.1 mm, the laminate film containing an aluminum foil having a thickness of 40 μm and a polypropylene layer formed on each surface of the aluminum foil. The electrode group housed in the pack was subjected to vacuum drying at 80° C. for 24 hours.

<Preparation of Liquid Nonaqueous Electrolyte>

A liquid nonaqueous electrolyte was prepared by dissolving $LiBF_4$ used as an electrolyte in a mixed solvent consisting of ethylene carbonate (EC) and γ-butyrolactone (GBL), which were mixed at a volume ratio of 1:2. The electrolyte was dissolved in the mixed solvent in an amount of 1.5 mol/L.

The liquid nonaqueous electrolyte thus prepared was poured into the laminate film pack having the electrode group housed therein, followed by completely closing the pack by means of heat seal to obtain 10 nonaqueous electrolyte secondary batteries each constructed as shown in FIG. 1, having a size of 80 mm×100 mm×6 mm, and a rated capacity of 3 Ah.

Prepared were two sets of modules each consisting of 5 secondary batteries that were connected in series. These modules were connected in parallel to obtain a battery module consisting of two sets of modules connected in parallel and each consisting of 5 secondary batteries that were connected in series. A battery pack as shown in FIGS. 2 and 3 was prepared by using the battery module thus obtained.

Examples 2 to 6

A nonaqueous electrolyte secondary battery was prepared as in Example 1, except that the electrode coating amount (slurry coating amount) was controlled to permit the negative electrode to have a value of the available electric capacity as shown in Table 1. Also, a battery pack was prepared as in Example 1, except that the secondary battery thus obtained was used.

Comparative Examples 1 and 2

A nonaqueous electrolyte secondary battery was prepared as in Example 1, except that the electrode coating amount was controlled to permit the negative electrode to have a value of the available electric capacity as shown in Table 1. Also, a battery pack was prepared as in Example 1, except that the secondary battery thus obtained was used.

Comparative Example 3

A nonaqueous electrolyte secondary battery was prepared as in Example 1, except that a ramsdellite type lithium-titanium composite oxide represented by $Li_2Ti_3O_7$ was used as the negative electrode active material. Also, a battery pack was prepared as in Example 1, except that the secondary battery thus obtained was used.

Comparative Example 6

A battery pack was manufactured as in Example 1, except that a lithium-manganese oxide powder having the composition represented by $LiMn_2O_4$ and having the spinel type crystal structure was used as the positive electrode active material.

Comparative Example 7

A battery pack was manufactured as in Example 1, except that an oxide powder having the composition represented by $LiFePO_4$ and having the olivine type crystal structure was used as the positive electrode active material.

300 cycles of charge-discharge cycle test was applied to each of the battery packs prepared in Examples 1 to 6 and Comparative Examples 1 to 3 under a temperature environment of 25° C., 45° C. and 60° C. In the charge-discharge cycle test, the charging operation at 3 C and the discharging operation at 3 C were alternately repeated within a battery voltage of 15 to 30 V.

The ratio (%) of the discharge capacity of the battery pack at the $300^{th}$ cycle of the test to the discharge capacity at the first cycle of the test is shown in Table 1 as the capacity retention ratio.

TABLE 1

|  | Positive electrode capacity (mAh/cm²) | Negative electrode capacity (mAh/cm²) | Available electric capacity ratio X | Capacity retention ratio under a temperature environment of 25° C. (%) | Capacity retention ratio under a temperature environment of 45° C. (%) | Capacity retention ratio under a temperature environment of 60° C. (%) |
|---|---|---|---|---|---|---|
| Example 1 | 1.250 | 1.275 | 1.02 | 86 | 72 | 48 |
| Example 2 | 1.250 | 1.288 | 1.03 | 86 | 79 | 62 |
| Example 3 | 1.250 | 1.300 | 1.05 | 86 | 78 | 63 |
| Example 4 | 1.250 | 1.500 | 1.20 | 87 | 79 | 64 |
| Example 5 | 1.250 | 1.800 | 1.44 | 87 | 79 | 64 |
| Example 6 | 1.250 | 2.500 | 2.0 | 87 | 79 | 64 |
| Comparative Example 1 | 1.250 | 1.200 | 0.96 | 86 | 14 | 0 |
| Comparative Example 2 | 1.250 | 1.250 | 1.00 | 86 | 9 | 0 |
| Comparative Example 3 | 1.250 | 1.275 | 1.02 | 80 | 0 | 0 |
| Comparative Example 6 | 1.250 | 1.275 | 1.02 | 60 | 0 | 0 |
| Comparative Example 7 | 1.250 | 1.275 | 1.02 | 50 | 0 | 0 |

As shown in Table 1, the capacity retention ratio of the battery pack for each of Examples 1 to 6 is higher than that for each of Comparative Examples 1 to 3 under a temperature environment of any of 45° C. and 60° C. The experimental data clearly support that the battery pack according to the embodiment of the present invention exhibits an excellent charge-discharge cycle characteristics under a wide temperature range of room temperature to high temperatures.

It should also be noted that the battery pack for each of Examples 2 to 6 exhibits a high capacity retention ratio under a temperature environment of 45° C. and 60° C., compared with the battery pack for Example 1. The experimental data clearly support that the battery pack comprising the nonaqueous electrolyte batteries, in which the ratio X of the available electric capacity of the negative electrode to the available electric capacity of the positive electrode at 25° C. satisfies $1.03 \leq X \leq 2$, makes it possible to further improve the charge-discharge cycle characteristics under an environment of a high temperature.

As apparent from the experimental data for Comparative Examples 6 and 7, the capacity retention ratio was made inferior under an environment of any of 25° C., 45° C. and 60° C. in the case of using the metal oxide having the spinel type crystal structure or the olivine type crystal structure.

CHARGE-DISCHARGE CYCLE TEST 2

Example 7

A nonaqueous electrolyte secondary battery was prepared as in Example 1, except that a lithium-nickel-cobalt-aluminum composite oxide powder represented by $LiNi_{0.75}Co_{0.19}Al_{0.05}O_2$ and having a layered halite type crystal structure was used as the positive electrode active material. Also, a battery pack was prepared as in Example 1, except that the secondary battery thus prepared was used.

Examples 8 to 12

A nonaqueous electrolyte secondary battery was prepared as in Example 1, except that the electrode coating amount was controlled to permit the negative electrode to exhibit a value of the available electric capacity as shown in Table 2. Also, a battery pack was prepared as in Example 1, except that the secondary battery thus prepared was used.

Comparative Examples 4 and 5

A nonaqueous electrolyte secondary battery was prepared as in Example 1, except that the electrode coating amount was controlled to permit the negative electrode to exhibit a value of the available electric capacity as shown in Table 2. Also, a battery pack was prepared as in Example 1, except that the secondary battery thus prepared was used.

A charge-discharge cycle test was applied as in charge-discharge cycle test 1 to each of the battery packs prepared in each of Examples 7 to 12 and Comparative Examples 4 and 5. Table 2 also shows the result.

TABLE 2

|  | Positive electrode capacity (mAh/cm²) | Negative electrode capacity (mAh/cm²) | Available electric capacity ratio X | Capacity retention ratio under a temperature environment of 25° C. (%) | Capacity retention ratio under a temperature environment of 45° C. (%) | Capacity retention ratio under a temperature environment of 60° C. (%) |
|---|---|---|---|---|---|---|
| Example 7 | 1.250 | 1.275 | 1.02 | 84 | 72 | 48 |
| Example 8 | 1.250 | 1.288 | 1.03 | 85 | 77 | 61 |
| Example 9 | 1.250 | 1.300 | 1.05 | 85 | 77 | 62 |
| Example 10 | 1.250 | 1.500 | 1.20 | 86 | 77 | 62 |
| Example 11 | 1.250 | 1.800 | 1.44 | 86 | 77 | 64 |
| Example 12 | 1.250 | 2.500 | 2.0 | 86 | 77 | 64 |
| Comparative Example 4 | 1.250 | 1.200 | 0.96 | 80 | 9 | 0 |
| Comparative Example 5 | 1.250 | 1.250 | 1.00 | 78 | 14 | 0 |

As shown in Table 2, the capacity retention ratio of the battery pack for each of Examples 7 to 12 is higher than that for each of Comparative Examples 4 and under a temperature environment of any of 25° C., 45° C. and 60° C. The experimental data clearly support that the battery pack comprising the nonaqueous electrolyte batteries, in which the ratio X of the available electric capacity of the negative electrode to the available electric capacity of the positive electrode at 25° C. satisfies $1.03 \leq X \leq 2$, makes it possible to further improve the charge-discharge cycle characteristics under an environment of a high temperature.

CHARGE-DISCHARGE CYCLE TEST 3

Examples 13 to 21

A nonaqueous electrolyte secondary battery was prepared as in Example 2, except that a lithium-nickel-cobalt composite oxide powder represented by $LiNi_aCo_{(1-a)}O_2$, the nickel molar ratio "a" being shown in Table 3, and having a layered halite type crystal structure was used as the positive electrode active material. Also, a battery pack was prepared as in Example 1, except that the secondary battery thus prepared was used.

A charge-discharge cycle test was applied as in charge-discharge cycle test 1 to each of the battery packs thus prepared. Table 3 also shows the result.

pack comprising the nonaqueous electrolyte batteries using the lithium-transition metal oxide, in which the Ni mole amount is not larger than 0.85 (including 0.0) based on the sum of the mole amount of M1 and M2, permits further improving the charge-discharge cycle characteristics over a wide temperature region ranging between room temperature and a high temperature.

<Temperature Dependence of Available Electric Capacity of $LiNi_aCo_{(1-a)}O_2$>

The available electric capacity of the battery pack for each of Examples 13 to 20 was measured under a temperature environment of 25° C. by using the conditions given herein later. Then, the available electric capacity was also measured under a temperature environment of 45° C. and a temperature environment of 60° C. in place of the measurement under a temperature environment of 25° C. The experimental data were used for calculating the ratio of the available electric capacity at 45° C. to the available electric capacity at 25° C. of the positive electrode (hereinafter referred to as the 45° C./25° C. available electric capacity ratio) and the ratio of the available electric capacity at 60° C. to the available electric capacity at 25° C. of the positive electrode (hereinafter referred to as the 60° C./25° C. available electric capacity ratio).

Figure 6:
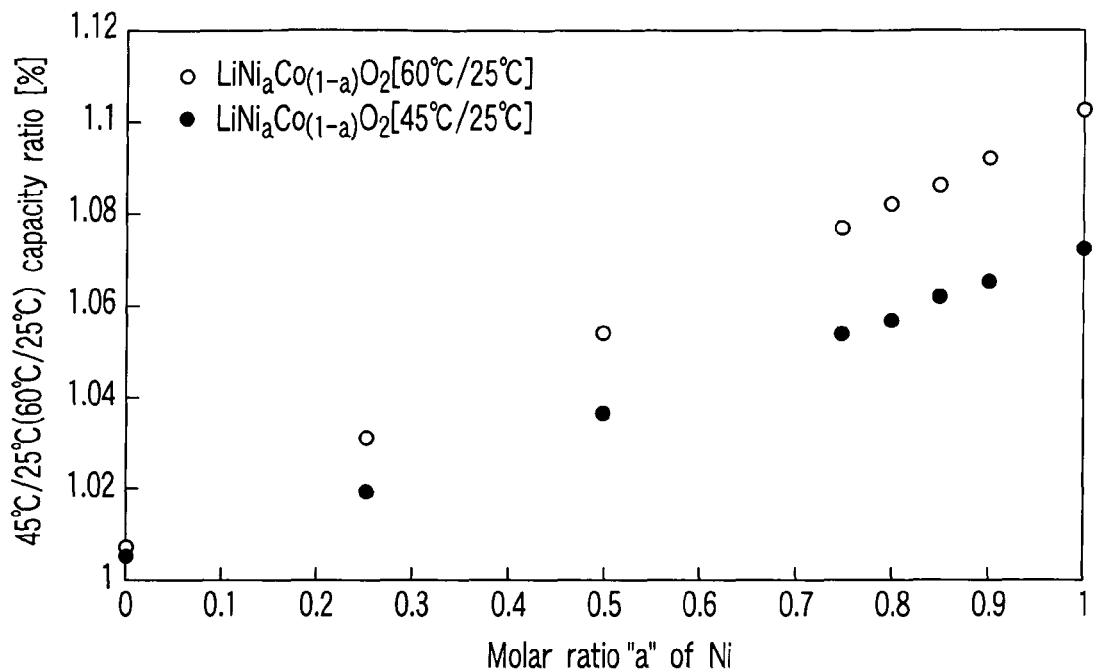
FIG. 6 is a graph showing the dependence on temperature of the available electric capacity of $LiNi_aCo_{(1-a)}O_2$.

FIG. 6 is a graph showing the experimental data. As shown in FIG. 6, each of the 45° C./25° C. available electric capacity

TABLE 3

|  | $LiNi_aCo_{(1-a)}O_2$ a = | Positive electrode capacity (mAh/cm²) | Negative electrode capacity (mAh/cm²) | Available electric capacity ratio X | Capacity retention ratio under a temperature environment of 25° C. (%) | Capacity retention ratio under a temperature environment of 45° C. (%) | Capacity retention ratio under a temperature environment of 60° C. (%) |
|---|---|---|---|---|---|---|---|
| Example 13 | 0.00 | 1.250 | 1.288 | 1.03 | 86 | 79 | 62 |
| Example 14 | 0.25 | 1.250 | 1.288 | 1.03 | 86 | 77 | 62 |
| Example 15 | 0.30 | 1.250 | 1.288 | 1.03 | 86 | 77 | 62 |
| Example 16 | 0.50 | 1.250 | 1.288 | 1.03 | 86 | 77 | 62 |
| Example 17 | 0.75 | 1.250 | 1.288 | 1.03 | 84 | 76 | 62 |
| Example 18 | 0.80 | 1.250 | 1.288 | 1.03 | 84 | 76 | 62 |
| Example 19 | 0.85 | 1.250 | 1.288 | 1.03 | 82 | 75 | 62 |
| Example 20 | 0.90 | 1.250 | 1.288 | 1.03 | 80 | 70 | 54 |
| Example 21 | 1.00 | 1.250 | 1.288 | 1.03 | 77 | 69 | 48 |

As shown in Table 3, the battery pack for each of Examples 13 to 19 exhibits a high capacity retention ratio under a temperature environment of any of 25° C., 45° C. and 60° C., compared with the battery pack for each of Examples 20 and 21. The experimental data clearly support that the battery ratio and the 60° C./25° C. available electric capacity ratio can be represented substantially by the primary function. It has been found that each of the 45° C./25° C. available electric capacity ratio and the 60° C./25° C. available electric capacity ratio is increased with increase in the amount of Ni.

In the case of using $LiNiO_2$ having a nickel molar ratio "a" of 1 as the positive electrode active material, the 45° C./25° C. available electric capacity ratio was found to be 1.068 and the 60° C./25° C. available electric capacity ratio was found to be 1.096. The ratio of 1.068 noted above is smaller than the ratio 1.07 of the available electric capacity at 45° C. to the available electric capacity at 25° C. of the negative electrode containing the spinel type lithium-titanium composite oxide. Also, the ratio of 1.096 noted above is smaller than the ratio 1.10 of the available electric capacity at 60° C. to the available electric capacity at 25° C. of the negative electrode. It follows that it has been clarified that, if the available electric capacity of the negative electrode is set larger than 1.02 times as large as the available electric capacity of the positive electrode under a temperature environment of 25° C., the capacity balance is not inverted even under 45° C. and 60° C. to obtain a sufficient effect.

Incidentally, it is possible to determine the ratio of the available electric capacity of the negative electrode to that of the positive electrode, said ratio being particularly adapted for a desired high temperature environment, by using the experimental data given in FIG. 6.

CHARGE-DISCHARGE CYCLE TEST 4

Examples 22 to 25

A nonaqueous electrolyte secondary battery was prepared as in Example 2, except that a lithium-nickel-cobalt-manganese composite oxide powder represented by $LiNi_bCo_{0.25}Mn_{(0.75-b)}O_2$, the nickel molar ratio "b" being shown in Table 4, and having a layered halite type crystal structure was used as the positive electrode active material. Also, a battery pack was prepared as in Example 1, except that used was the secondary battery thus prepared.

A charge-discharge cycle test was applied as in charge-discharge cycle test 1 to each of the battery packs thus prepared. Table 4 also shows the result.

of the working electrode and the counter electrode in the dry argon atmosphere. These three members are put in a three pole type glass cell to bring the working electrode, the counter electrode and the reference electrode into contact with the terminals of the glass cell, respectively. Then, an electrolysis solution is poured into the glass cell, followed by hermetically closing the glass cell under the state that the separator and the electrodes are sufficiently impregnated with the electrolysis solution. Incidentally, the electrolysis solution used was prepared by dissolving $LiBF_4$ used as an electrolyte in a mixed solvent prepared by mixing ethylene carbonate (EC) and γ-butyrolactone (GBL) in a mixing ratio by volume of 1:2. The half-cell thus prepared was charged with a constant current of 0.2 C under a temperature environment of 25° C. until the working electrode potential relative to the lithium metal was increased to reach 4.25 V and, then, the half-cell was discharged with a constant current of 0.2 C under a temperature environment of 25° C. until the working electrode potential relative to the lithium metal was lowered to reach 3.5 V, thereby determining the available electric capacity of the positive electrode at 25° C. The available electric capacity thus obtained was divided by the area of the positive electrode layer to obtain the available electric capacity A of the positive electrode per unit area at 25° C.

Next, the negative electrode will be described.

A half-cell was prepared as above, except that a negative electrode was used in place of the positive electrode. The half-cell thus prepared was charged with a constant current of 0.2 C under a temperature environment of 25° C. until the working electrode potential relative to the lithium metal was charged to reach 1.0 V and, then, the half-cell was discharged with a constant current of 0.2 C under a temperature environment of 25° C. until the working electrode potential relative to the lithium metal was changed to reach 2.0 V, thereby determining the available electric capacity of the negative electrode at 25° C. The available electric capacity thus obtained was divided by the area of the negative electrode layer to obtain the available electric capacity B per unit area of the negative electrode at 25° C.

TABLE 4

| | $LiNi_bCo_{0.25}Mn_{(0.75-b)}O_2$ b = | Positive electrode capacity (mAh/cm²) | Negative electrode capacity (mAh/cm²) | Available electric capacity ratio X | Capacity retention ratio under a temperature environment of 25° C. (%) | Capacity retention ratio under a temperature environment of 45° C. (%) | Capacity retention ratio under a temperature environment of 60° C. (%) |
|---|---|---|---|---|---|---|---|
| Example 22 | 0.00 | 1.250 | 1.288 | 1.03 | 86 | 79 | 64 |
| Example 23 | 0.25 | 1.250 | 1.288 | 1.03 | 86 | 77 | 63 |
| Example 24 | 0.50 | 1.250 | 1.288 | 1.03 | 84 | 76 | 62 |
| Example 25 | 0.75 | 1.250 | 1.288 | 1.03 | 84 | 76 | 62 |

The experimental data given in Table 4 support that the charge-discharge cycle characteristics of the battery pack can be improved under a high temperature environment even in the case of using a lithium-transition metal oxide containing manganese as the positive electrode active material.

The available electric capacity of the positive electrode and that of the negative electrode used in the Examples described above will now be described.

<Measuring Method of Available Electric Capacity>

The positive electrode will now be described first.

A positive electrode as a working electrode and a lithium metal foil as a counter electrode are arranged to face each other with a glass filter used as a separator interposed therebetween in a dry argon atmosphere and, then, a lithium metal sheet is inserted as a reference electrode so as not to touch any The value obtained by dividing the available electric capacity B by the available electric capacity A represents the ratio X of the available electric capacity of the negative electrode at 25° C. to the available electric capacity of the positive electrode at 25° C. In the Example described above, the ratio X of the available electric capacity was calculated in respect of optional two of the ten secondary batteries constituting the battery pack, and the average value of the ratios X was used as the ratio X of the available electric capacity of the battery pack.

Incidentally, the charging was performed with a low current in order to permit the charging reaction to be finished sufficiently.

Incidentally, the temperature environment for measuring the available electric capacity was formed by using, for example, a constant temperature vessel type No. EC-45MTP manufactured by Hitachi Ltd.

FIG. 7 is a graph showing the charge-discharge curve, covering the case where the measuring method described above was carried out by using the nonaqueous electrolyte battery according to this embodiment of the present invention.

The charge-discharge curve shown in FIG. 7 is directed to a nonaqueous electrolyte battery using the spinel type lithium-titanium composite oxide in the negative electrode and a lithium-cobalt composite oxide in the positive electrode. In this nonaqueous electrolyte battery, the ratio X of the available electric capacity of the negative electrode to the available electric capacity of the positive electrode was set at 1.045.

On the other hand, FIG. 8 is a graph showing the charge-discharge curve, which was obtained by applying the measuring method described above to a nonaqueous electrolyte battery designed as above, except that the positive electrode and the negative electrode were made equal to each other in the available electric capacity.

<Measuring Method of the Composition of Lithium-Transition Metal Oxide>

The composition of the lithium-transition metal oxide can be quantified by, for example, an inductively coupled plasma atomic emission spectroscopy (ICP-AES).

<Measuring Method of Crystal Structure of Lithium-Transition Metal Oxide>

The crystal structure can be identified by an XRD analysis. Concerning the known substance, the crystal structure can be identified by performing the XRD measurement, followed by comparing the obtained pattern with the JCPDS (Joint Committee on Powder Diffraction Standards) card. When it comes to an unknown substance, the crystal structure can be identified by employing the technology described in, for example, Chapter 10 of "Shinban B. D. Cullity Xsenkaisetsu youron (B. D. Cullity, Elements of X-ray Diffraction, new Edition)", translated by Gentaro Matsumura and published by Agne Showfu-sha Inc.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A battery pack comprising nonaqueous electrolyte batteries, each comprising:
    a positive electrode containing a positive electrode current collector, and a positive electrode layer which is formed on both surfaces of the positive electrode current collector and contains a lithium-transition metal oxide having a layered crystal structure;
    a negative electrode containing a negative electrode current collector, and a negative electrode layer which is formed on both surfaces of the negative electrode current collector and contains a lithium-titanium composite oxide having a spinel structure; and
    a nonaqueous electrolyte,
    wherein the positive electrodes and the negative electrodes satisfy the formula (1) given below:

$$1.02 \leq X \leq 2 \qquad (1)$$

where X is a ratio of an available electric capacity of each of the negative electrodes at 25° C. to an available electric capacity of each of the positive electrodes at 25° C.,
the available electric capacity of each of the positive electrodes is an electric capacity obtained by charging under a constant current of 0.2 C to reach 4.25 V, followed by discharging under a constant current of 0.2 C to reach 3.5 V, and
the available electric capacity of each of the negative electrodes is an electric capacity obtained by charging under a constant current of 0.2 C to reach 1.0 V, followed by discharging under a constant current of 0.2 C to reach 2.0 V.

2. The battery pack according to claim 1, wherein an amount of increase in an available electric capacity of each of the positive electrodes accompanying a temperature elevation is small, compared with an amount of increase in an available electric capacity of each of the negative electrodes accompanying a temperature elevation.

3. The battery pack according to claim 1, wherein the positive electrodes and the negative electrodes satisfy the formula (2) given below:

$$1.02 \leq X \leq 1.44 \qquad (2)$$

where X is the ratio of the available electric capacity of each of the negative electrodes at 25° C. to the available electric capacity of each of the positive electrodes at 25° C.

4. The battery pack according to claim 1, wherein the positive electrodes and the negative electrodes satisfy the formula (3) given below:

$$1.03 \leq X \leq 1.44 \qquad (3)$$

where X is the ratio of the available electric capacity of each of the negative electrodes at 25° C. to the available electric capacity of each of the positive electrodes at 25° C.

5. The battery pack according to claim 1, wherein the lithium-transition metal oxide includes at least one composite oxide selected from the group consisting of lithium-cobalt composite oxide, lithium-nickel composite oxide and lithium-manganese composite oxide.

6. The battery pack according to claim 1, wherein the layered crystal structure of the lithium-transition metal oxide is a layered halite type structure.

7. The battery pack according to claim 1, wherein the lithium-transition metal oxide is represented by a composition formula of $Li_y M1_{z1} M2_{z2} O_2$, where M1 is at least one element selected from the group consisting of Co, Ni and Mn, M2 is at least one element selected from the group consisting of Fe, Al, B, Ga and Nb, and $0 < y \leq 1.2$, $0.98 \leq z1+Z2 \leq 1.2$ and $0 \leq z2 < 0.2$, and where a ratio of a Ni amount to a sum of M1 and M2 is not larger than 0.85 (including 0).

8. The battery pack according to claim 1, wherein the lithium-transition metal oxide is represented by a composition formula of $Li_y M1_{z1} M2_{z2} O_2$, where M1 is at least one element selected from the group consisting of Co, Ni and Mn, M2 is at least one element selected from the group consisting of Fe, Al, B, Ga and Nb, and $0 < y \leq 1.2$, $0.98 \leq z1+Z2 \leq 1.2$ and $0 \leq z2 < 0.2$, and where a ratio of a Ni amount to a sum of M1 and M2 is not smaller than 0.3 and not larger than 0.85.

9. The battery pack according to claim 1, wherein the nonaqueous electrolyte contains at least two kinds of solvents selected from the group consisting of propylene carbonate, ethylene carbonate and γ-butyrolactone.

10. The battery pack according to claim 1, wherein each of the nonaqueous electrolyte batteries has a rated capacity not smaller than 2 Ah and not larger than 100 Ah.

11. The battery pack according to claim 1, which includes at least 5 nonaqueous electrolyte batteries and not larger than 500 nonaqueous electrolyte batteries.

12. The battery pack according to claim 1, which further comprising a protective circuit which detects a voltage of the nonaqueous electrolyte batteries.

13. The battery pack according to claim 1, wherein each of the nonaqueous electrolyte batteries has a rated capacity not smaller than 3 Ah and not larger than 15 Ah.

14. The battery pack according to claim 1, which includes at least 5 nonaqueous electrolyte batteries and not larger than 200 nonaqueous electrolyte batteries.

15. The battery pack according to claim 1, wherein the negative electrode comprises a negative electrode current collector formed of an aluminum foil or an aluminum alloy foil.

16. The battery pack according to claim 1, wherein each of the aluminum foil and the aluminum alloy foil has an average crystal grain size not larger than 50 μm.

17. The battery pack according to claim 1, wherein at least some of the nonaqueous electrolyte batteries further comprises:
    a case including a first sealing section formed at one edge portion and a second sealing section formed at another edge portion opposite to said one edge portion;
    a positive electrode terminal including a tip portion withdrawn to an outside via the first sealing section of the case; and
    a negative electrode terminal including a tip portion withdrawn to the outside via the second sealing section of the case.

18. The battery pack according to claim 17, wherein each of the negative electrode terminal and the positive electrode terminal is formed of aluminum or aluminum alloy.

19. The battery pack according to claim 1, wherein the case is formed of a laminate film.

20. A vehicle comprising a battery pack defined in claim 1.

* * * * *